United States Patent
Parker et al.

(10) Patent No.: US 11,291,332 B2
(45) Date of Patent: Apr. 5, 2022

(54) SYSTEMS AND METHODS FOR AN AUTOMATED BARBECUE SMOKER

(71) Applicant: President and Fellows of Harvard College, Cambridge, MA (US)

(72) Inventors: Kevin Kit Parker, Cambridge, MA (US); Alexander Peyton Nesmith, Somerville, MA (US); Joseph A. Festa, Cambridge, MA (US); Michel Maalouly, Cambridge, MA (US); Elizabeth Olayinka Ogunbiyi, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 298 days.

(21) Appl. No.: 15/544,270

(22) PCT Filed: Jan. 26, 2016

(86) PCT No.: PCT/US2016/014934
§ 371 (c)(1),
(2) Date: Jul. 18, 2017

(87) PCT Pub. No.: WO2016/123111
PCT Pub. Date: Aug. 4, 2016

(65) Prior Publication Data
US 2018/0008093 A1  Jan. 11, 2018

Related U.S. Application Data

(60) Provisional application No. 62/107,594, filed on Jan. 26, 2015.

(51) Int. Cl.
*A47J 37/07* (2006.01)

(52) U.S. Cl.
CPC ....... *A47J 37/0754* (2013.01); *A47J 37/0704* (2013.01); *A47J 37/0786* (2013.01)

(58) Field of Classification Search
CPC . A47J 37/0754; A47J 37/0786; A47J 37/0704
See application file for complete search history.

(56) References Cited

U.S. PATENT DOCUMENTS 3,765,397 A * 10/1973 Henderson ................ F24B 3/00
126/25 R
4,587,947 A * 5/1986 Tomita ................ A47J 37/0763
126/25 R (Continued)

FOREIGN PATENT DOCUMENTS

| CN | 202653955 U | 1/2013 |
| WO | 2001/023808 A1 | 4/2001 |
| WO | 2013/116946 A1 | 8/2013 |

OTHER PUBLICATIONS

Christian Aßalg: "Tutorial: BBQ Guru CyberQ Wifi", Nov. 15, 2013 Retrieved from Internet: https://www.chilis-grillen.de/wsm/bbq-guru-cyberq-wifi-tutorial-deutsch-anleitung-einrichtung-setup-wlan-thermometer.

(Continued)

*Primary Examiner* — Thien S Tran
(74) *Attorney, Agent, or Firm* — McCarter & English, LLP; Maria Laccotripe Zacharakis; Anita M. Bowles

(57) ABSTRACT

Devices, systems, and computer-readable medium are provided for a barbecue smoker device. A barbecue smoker device is provided, that includes a multi-wall container, a food platform, a heat source, an air vent at the top of the barbecue smoker device, an air flow control mechanism at the lower portion of the barbecue smoker device, and a plurality of sensors coupled to the barbecue smoker device. The barbeque smoker device may include a control device for automated control of the air flow control mechanism. A (Continued)

system for remotely controlling a barbecue smoker device is provided, where the system includes a barbecue smoker device including a processor and a display unit, a mobile device in wireless communication with the barbecue smoker device, and the mobile device displaying a graphical user interface that is configured to receive input from a user causing a configuration change in the barbecue smoker device.

16 Claims, 15 Drawing Sheets

(56) References Cited

U.S. PATENT DOCUMENTS

| | | | | |
|---|---|---|---|---|
| 5,086,752 | A * | 2/1992 | Hait | F24C 1/16 126/25 R |
| 5,425,352 | A * | 6/1995 | Gillam | A47J 37/0763 126/25 R |
| 5,471,916 | A * | 12/1995 | Bird | A47J 37/0704 126/25 R |
| 8,651,018 | B1 * | 2/2014 | Loud, III | A47J 37/0704 126/25 R |
| 8,800,542 | B1 * | 8/2014 | Kennington | F24B 15/005 126/25 B |
| 2003/0015188 | A1 * | 1/2003 | Harbin | A47J 37/0786 126/25 R |
| 2006/0225724 | A1 | 10/2006 | Turner | |
| 2007/0062513 | A1 * | 3/2007 | Gagas | F24C 15/2021 126/299 D |
| 2009/0308373 | A1 | 12/2009 | Scott et al. | |
| 2010/0258106 | A1 * | 10/2010 | Simms, II | A47J 37/0704 126/25 R |
| 2014/0165993 | A1 * | 6/2014 | Ahmed | A47J 37/0704 126/25 R |
| 2015/0004297 | A1 | 1/2015 | Pothetes | |
| 2015/0282660 | A1 * | 10/2015 | Sarvestani | A47J 37/0786 99/331 |
| 2016/0037966 | A1 * | 2/2016 | Chin | A47J 37/0647 426/231 |

OTHER PUBLICATIONS

Mahoney, Everything is Under Control—Part 1, http://www.grillinsmokin.net, Jan. 19, 2015. Retrieved from Internet: http://grillinsmokin.net/blogs_all/blog_2015/files/everything_is_under_control-part_1.php.

Mahoney, CyberCook CyberQ Wifi Software, http://www.grillinsmokin.net, Feb. 1, 2015. Retrieved from Internet: http://grillinsmokin.net/blogs_all/blog_2015/files/cybercook-cyber_wifi_software.php.

International Preliminary Report on Patentability for PCT/US2016/014934 dated Aug. 1, 2017.

European Search Report for European Patent Application No. 21179469.8, dated Jul. 1, 2021.

* cited by examiner

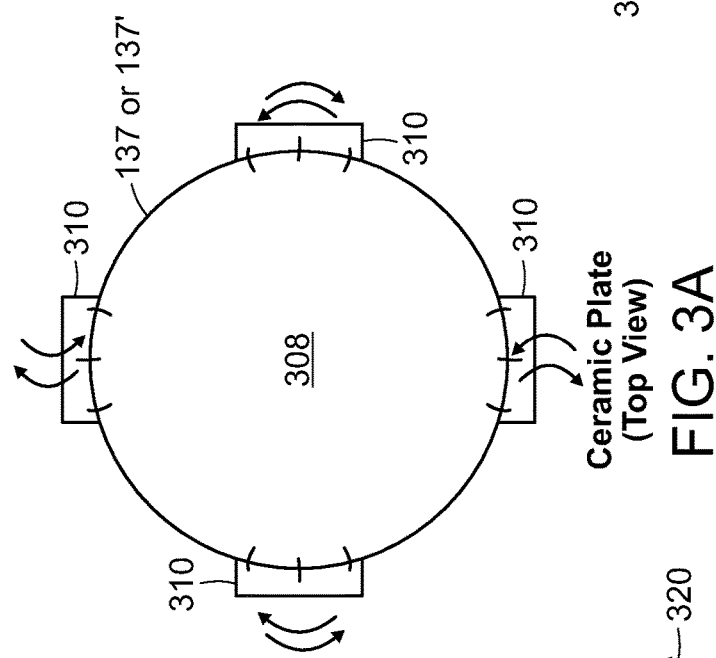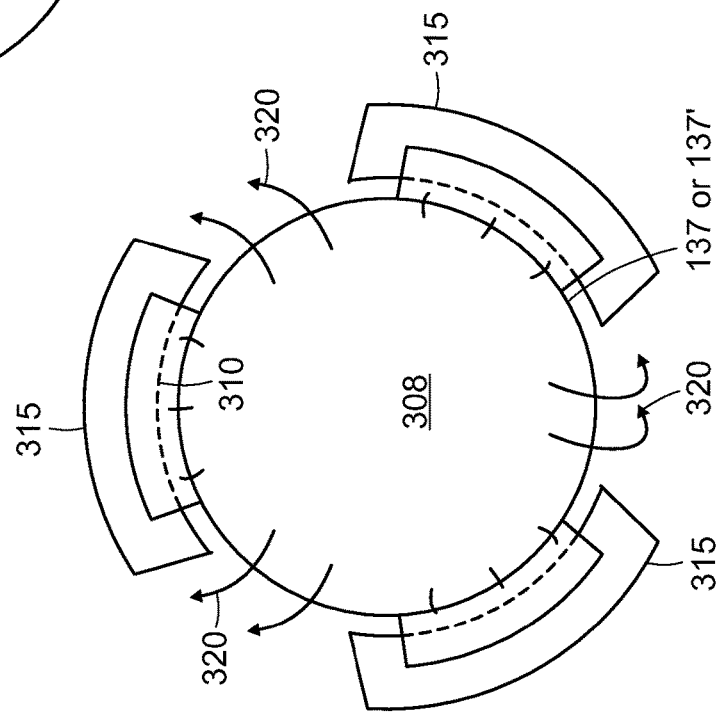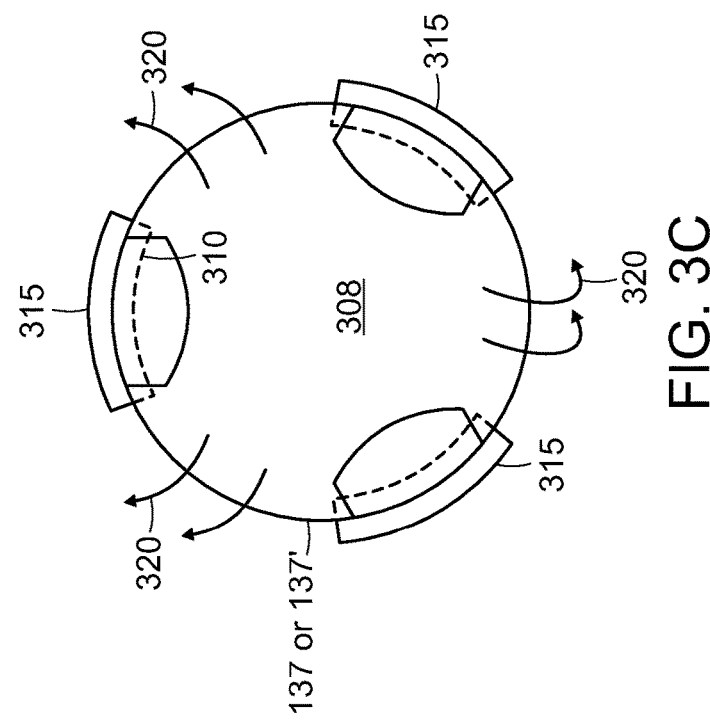

SYSTEMS AND METHODS FOR AN AUTOMATED BARBECUE SMOKER

RELATED APPLICATIONS

The present application is a 35 U.S.C. § 371 national stage filing of International Application No. PCT/US2016/014934, filed on Jan. 26, 2016, which in turn is related to and claims the benefit of priority to U.S. Provisional Application No. 62/107,594, filed on Jan. 26, 2015. The entire contents of each of the foregoing applications are hereby incorporated herein by reference.

BACKGROUND OF THE INVENTION

Smoking and grilling are common methods for cooking food. In the smoking method, food is flavored and slow-cooked at relatively low heat by exposing it to smoke in a closed container called a smoker. The smoke is usually produced by wood exposed to a heat source such as coal or propane. In the grilling method, food is quickly cooked at relatively high heat by directly applying heat from a heat source such as coal or gas. It is particularly difficult to achieve optimal results during smoking of food due in part to the long duration of smoking (e.g., a 12 hour smoking time is common for some cuts of meat) over which conditions inside the smoke and ambient conditions may change dramatically and the inability to see the food during smoking as opening the smoker substantially interferes with the smoking process.

SUMMARY

In one aspect, the invention relates to an adjustable barbecue smoker device for cooking food. The barbecue smoker device includes a container body having an upper portion and a lower portion, a food platform, a heat source, an upper vent disposed at the upper portion of the container body, at least one lower vent disposed at the lower portion of the container body, an air flow control mechanism disposed at the lower portion of the container body, at least one sensor, and a control device configured to collect data from the at least one sensor and to adjust airflow using the air flow control mechanism based on the data collected.

In certain embodiments, at least part of the lower portion of the container body has a substantially hyperboloid shape. In some embodiments, the barbecue smoker device also includes a fan associated with the at least one lower vent configured to draw air into the container body, where the plane of rotation of blades of the fan is substantially perpendicular to a wall of the container body where the at least one lower vent is disposed. In some embodiments, a fan associated with the at least one lower vent is configured to draw air into the container body, where the fan is oriented to direct airflow vertically downward. In some embodiments, the barbecue smoker device also includes a pre-heating mechanism associated with the fan and with the at least one lower vent, wherein the pre-heating mechanism is configured to heat the air drawn into the container body by the fan.

In certain embodiments, the barbecue smoker device further includes a fan associated with the at least one lower vent that is configured to draw air into the container body, and a pre-heating mechanism associated with the fan and with the at least one lower vent, where the pre-heating mechanism is configured to heat the air drawn into the container body by the fan.

In some embodiments, the barbecue smoker device further includes a water container platform configured to be supported by the container body at different heights within the smoker, where the water container platform is configured to support one or more water containers. In some embodiments, the water container platform includes a central portion and a plurality of peripheral portions each connected to the central portion by a hinge, where the water container platform is configured to be supported by the container body at a first height with the plurality of peripheral portions folded into a first configuration and is configured to be supported by the container body at a second height, greater than the first height, with the plurality of peripheral portions unfolded flat in a second configuration. In certain embodiments, the water container platform is made of a ceramic material.

In certain embodiments, the barbecue smoker device further includes a water container configured to be supported by the container body at different heights within the smoker. In some embodiments, the water container comprises a central portion and a plurality of peripheral portions each connected to the central portion by a hinge, the central portion including a recess for holding water, where the water container is configured to be supported by the container body at a first height with the plurality of peripheral portions folded into a first configuration and configured to be supported by the container body at a second height, greater than the first height, with the plurality of peripheral portions unfolded flat in a second configuration. In certain embodiments, the water container platform is made of a ceramic material.

In some embodiments, the lower portion of the container body comprises an exterior wall spaced apart from an interior wall by an insulating layer. In certain embodiments, the insulating layer comprises an air gap.

In certain embodiments, the control device is programmed to determine desired smoking conditions based on user input regarding food to be cooked.

In another aspect, the invention relates to an barbecue smoker device for cooking food, where the barbecue smoker device includes a container body having an upper portion and a lower portion, at least part of the lower portion of the container body has a substantially hyperboloid shape, a food platform, a heat source, an upper vent disposed at the upper portion of the container body, and at least one lower vent disposed at the lower portion of the container body. In certain embodiments, the lower portion of the container body comprises an exterior wall spaced apart from an interior wall by an insulating layer.

In another aspect, the invention relates to a system for remotely controlling a barbecue smoker device. The system includes a barbecue smoker device according to the above embodiments and coupled to a processor and a display unit, and a mobile device in wireless communication with the barbecue smoker device, where the mobile device is configured to display a graphical user interface, where the graphical user interface is configured to receive input from a user, the input causes a configuration change in the barbecue smoker device.

In some embodiments, the barbecue smoker device is configured to communicate data from the one or more sensors to the mobile device. In certain embodiments, the input relates to a change in cook time. In some embodiments, the input causes a change in the operational status of the air flow control mechanism.

In another aspect, the invention relates to a non-transitory machine readable storage medium storing at least one program that, when executed by at least one processor of a mobile device, causes the at least one processor to perform a method for remotely controlling a barbecue smoker device. The method includes receiving information related to a food item via a graphical user interface displayed on the mobile device, determining a desired cooking condition for the food item based on the information, displaying the desired cooking condition on the graphical user interface, and receiving an input from a user causing a configuration change in a barbecue smoker device according to any of the embodiments above.

In some embodiments, the information related to the food item includes a type of the food item, a weight of the food item, and a shape of the food item. In certain embodiments, the optimal cooking condition for the food item is determined using an algorithm. In some embodiments, the input relates to a change in cook time.

BRIEF DESCRIPTION OF THE DRAWINGS

Some embodiments are illustrated by way of example in the accompanying drawings, which are not intended to limit the scope of examples or embodiments of the invention. Further, the drawings are not to scale and do not depict relative sizes and dimensions.

FIG. 3A schematically depicts a top view of a ceramic water plate for a smoker, according to an embodiment;

FIG. 3B schematically depicts a top view of the ceramic water plate in a first configuration to be supported at a first height in the smoker;

FIG. 3C schematically depicts a top view of the ceramic water plate in a second configuration to be supported at a second height in the smoker;

DETAILED DESCRIPTION OF THE INVENTION

Figure 1A:
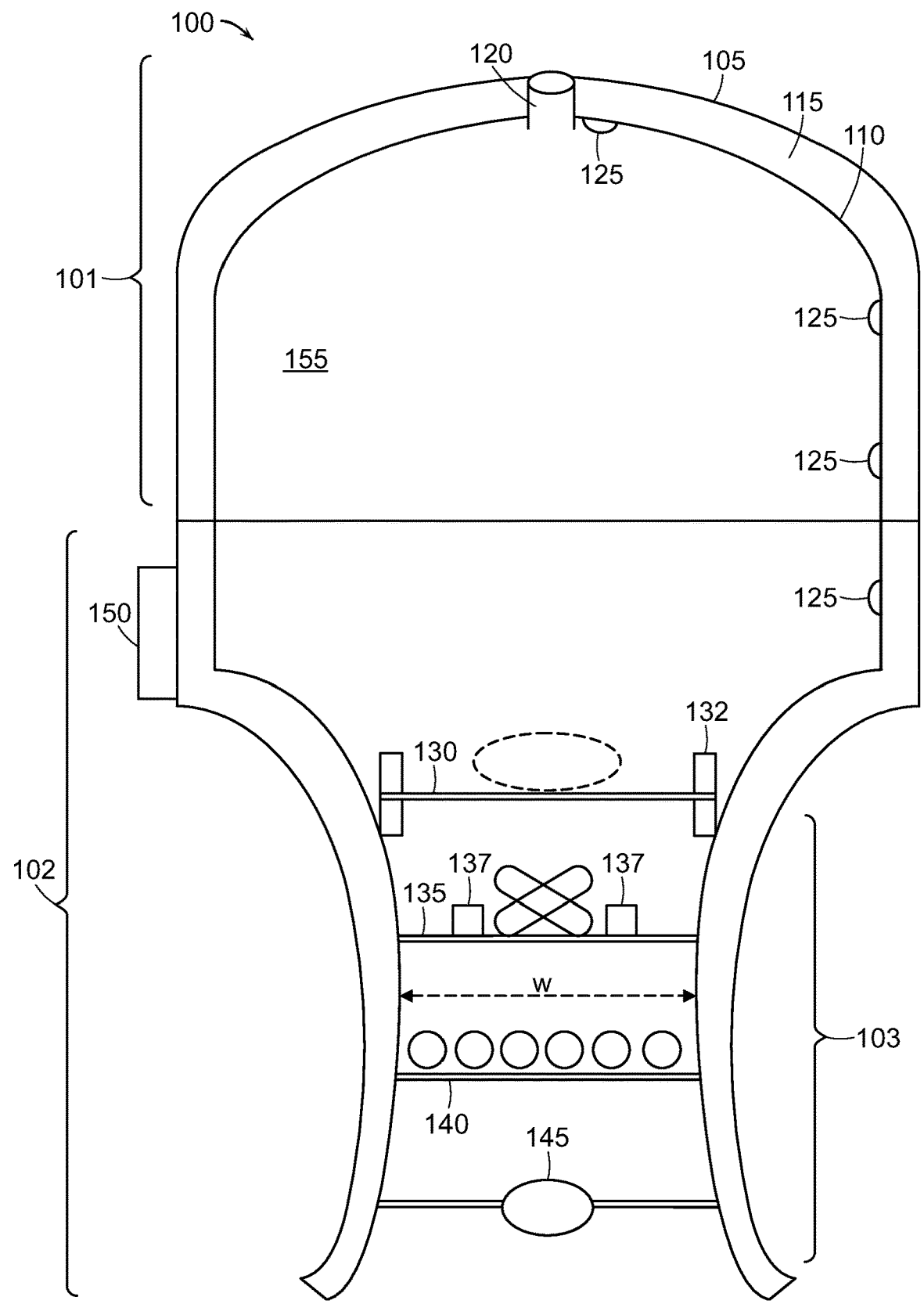
FIG. 1A schematically depicts a smoker, according to an embodiment.

Some embodiments described herein include devices, systems, and methods for an automated barbecue smoker. Some embodiments include an improved smoker design, a programmable smoker that can be remotely controlled, and a method for determining optimal cooking conditions for various food types. Some embodiments described herein include a smoking device including a container body having a shape that promotes temperature uniformity and/or smoke uniformity at a grill surface. Some embodiments described herein include a smoking device having a multi-walled container body that promotes heat retention and temperature uniformity.

Smoking and grilling food properly is important to ensure that the food is cooked and appropriate for consumption. Additionally, it is important to achieve desirable flavor and even cooking of the food. Different types of food require different conditions for best results. Factors regarding the internal environment of the smoker like heat, temperature, smoke, air flow, humidity, type and amount of wood, type of heat source, and other factors are considered when determining an optimal environment and optimal conditions for smoking.

As used herein, the term optimal conditions refers to conditions sufficient to achieve a desired outcome, which may be subject to user-provided criteria. Similarly, the term optimal environment refers to an environment sufficient to achieve a desired outcome. For example, the outcome could be a piece of meat cooked to a user-provided preference (e.g., user provided preference for intensity of smoke flavor). As an example, the user-provided criteria may limit the total smoking time to less than 8 hours. Thus, although a calculation may predict an exact set of optimized conditions, the optimal conditions refers to a range of conditions sufficient to achieve the desired outcome and the optimal environment refers to an environment sufficient to achieve a desired outcome.

The optimal conditions also vary based on the characteristics of the food itself, like the type of food (e.g., beef, pork, chicken, lamb, vegetables, etc.) the weight of the food, the size and shape of the food, the cut of the meat (when the food being cooked is meat) and the like. For example, the optimal cooking conditions for a beef brisket weighing 8 pounds are different than the optimal cooking conditions for a pork shoulder weighing 5 pounds. In addition to the factors related to the internal cooking environment of a smoker, external factors, such as, weather, atmospheric pressure, time of year and day, and the like, may also be considered in determining optimal cooking conditions.

Furthermore, these factors must be considered during the entire cooking process. Smoking certain types of food, like meat, is a lengthy process taking anywhere from 4 hours to 20 hours. As such, the cooking conditions fluctuate during the cooking process. It is important to be able to manage and control the internal conditions of the smoker during the time it takes to cook the food to achieve the best cooking results. Various embodiments of an automated smoker described herein aid in creating, managing, and controlling the optimal conditions for cooking food. In some embodiments, the automated smoker provides features that may include, but are not limited: to adjustable panels and walls to configure the size and shape of the smoker container, adjustable air vents to manage air flow in the smoker container, air flow control mechanisms, interior smoker temperature sensors, food temperature sensors, environmental temperature sensors, smoke sensors, air flow sensors, humidity sensors, an adjustable height adjustable food platform, automatically fillable water container, and other features. Various embodiments may include any or all of the aforementioned features. Some embodiments provide the ability to remotely control the smoker and the adjustable features of the smoker via an application installed on a user's mobile device. Some embodiments provide an automated smoker with a user interface on the smoker itself. Some embodiments provide methods for determining optimal conditions for cooking (e.g., smoking or grilling) a particular food type based on the weight, type, size and shape of the food. In some embodiments, a user preference (e.g., level of smokiness) is also used to determine optimal conditions for cooking. These example embodiments are described in detail below.

FIG. 1A schematically depicts an example smoker 100. The smoker 100 includes a container body having an upper portion 101 and a lower portion 102, an upper air vent 120, one or more sensors 125, a food platform 130, a wood platform 135, a heat source 140, and an air flow control mechanism 145. In some embodiments, the air flow control mechanism 145 includes a lower vent. In some embodiments, one or both of the upper portion 101 and the lower portion 102 of the container body include a multi-layered wall. For example, the container body of smoker 100 includes an exterior wall 105 and an interior wall 110 which are separated by and define an insulating air layer 115. In one embodiment, the smoker 100 can also be used as a grill or an oven to grill or bake food.

In one embodiment, at least part of the lower portion 102 of the container body of the smoker (e.g., a portion below the level of the food platform 130) has a shape similar to that of a hyperboloid as shown in FIG. 1A, where the smoker container body has a narrowed part 103 with waist w below the food platform 130 and widens near the food platform 130. The hyperboloid shape of the narrowed portion 103 may promote more even smoke exposure at the level of the food platform 130 as compared with some other conventional smoker shapes (e.g., vertical smokers with a cylindrical or truncated conical shape below the food platform). Typically, in conventional smokers, the part of the food that is closest to the burning wood has the longest contact time with the smoke. The hyperboloid structure of the narrowed part 103 of the smoker container body aids in achieving more even exposure of the food to smoke providing optimal cooking conditions for food. In the hyperboloid structure, the smoke moves rapidly through the narrowed part 103 of the smoker container body, then slows down above the narrowed part and in the upper portion of the smoker container body due to the increased diameter of the container. This allows for denser and heavier smoke particles to remain close to the food on the food platform 130, while the lighter more buoyant smoke particles leave the smoker through the upper air vent 120.

In some embodiments, the exterior wall 105 and the interior wall 110 form a multi-layer container for the smoker 100. In one embodiment, the exterior wall 105 and the interior wall 110 are spaced apart from each other as shown in FIG. 1A, so that the air layer 115 is formed between the exterior wall 105 and the interior wall 110. The air layer 115 between the exterior wall 105 and the interior wall 110 provides additional insulation to hold heat within the smoker. In alternative embodiments, the smoker container may be formed using more than two walls, that define one or more additional air layers. In some embodiments, the air layer 115 between the exterior wall 105 and interior wall 110 may be divided into multiple different compartments or pockets of air. In some embodiments, the container body may be single layered or single walled.

The exterior wall 105 and the interior wall 110 can be made of any suitable materials for a smoker, such that the smoker is optimized for heat capacitance and conductance with consideration of radiative effects. In some embodiments, the exterior wall 105 is made of a material that is different than the material of the interior wall 110. In some embodiments, the exterior wall 105 and the interior wall 110 both include the same material. In one embodiment, one or both of the exterior wall 105 and the interior wall 110 include a highly porous ceramic material that provides sufficient thermal insulation and prevents smoke from escaping from the smoker. The exterior wall 105 may include an outer coating or additional outer layer. Additional explanation of materials and configurations for a multi-wall container body are provided below in connection with FIGS. 4A-4C.

In some embodiments, the size and shape of the smoker can be configured or adjusted. The exterior wall 105 may include overlapping panels or collapsible wall portions that can be adjusted to change a height to diameter ratio of the smoker (e.g., to change a height of the smoker, to change a diameter of the smoker, or both). Similarly, the interior wall 110 may include overlapping panels or collapsible wall portions that can also be adjusted. In some embodiments, each overlapping panel or collapsible wall portion includes both part of the exterior wall 105 and part of the interior wall 110 The size and shape of the smoker may be adjusted based on the shape, size and type of food that is being cooked, so that the smoker has the desired structure for that food. The size and shape of the smoker can be automatically adjusted via a user interface on the smoker or via an application on a mobile device in communication with the smoker, as discussed in detail below. When adjusting the walls, the smoker may keep the same general shape (for example a hyperboloid shape as shown in FIG. 1A), and merely the diameter to height ratio may be modified to create an optimal cooking environment for a particular food. For example, a beef brisket weighing 8 lbs. may need a wider smoker, while a beef brisket weighing 4 lbs. may need a narrower smoker so that the food is evenly exposed to the smoke.

The upper air vent 120 is located at or near the top of the smoker 100 and operates as an air outlet. The upper air vent 120 allows air and smoke out from the interior of the smoker 100. In one embodiment, the surface area of an opening of the upper air vent 120 can be configured by a user to manage air and smoke flow in the smoker container during the cooking process. In some embodiments, more than one upper air vent may be employed. In an example embodiment, the surface area of an opening of the upper air vent 120 can be configured via an application on a mobile device or via a user interface on the smoker 100. In another example embodiment, the surface area of an opening of the upper air vent 120 may be automatically configured based on the internal conditions of the smoker container during the cooking process to continually ensure optimal cooking conditions in the smoker 100.

The interior of the smoker 100 includes a plurality of sensors 125 to measure the internal conditions of the smoker 100. The sensors 125 may include, but are not limited to, any of temperature sensors, smoke sensors, air sensors, and humidity sensors. The sensors 125 may measure conditions, such as, interior temperature of the smoker at various areas in the smoker, ambient conditions, air flow and velocity through the air vents, amount of smoke particles, chemical components of the smoke, humidity levels in the smoker, and the like. In some embodiments, the data collected by the sensors is communicated to a control device 150, such as a control panel and user interface on the smoker itself. In some embodiments the data collected by the sensors is communicated to a computing device, such as a mobile device, via a wireless communications link. In some embodiments, the data collected is communicated to both. Data can be collected by the sensors continuously through the cooking process or at pre-determined intervals of time during the cooking process. The data collected by the sensors can be used to determine whether the present conditions of the smoker match the optimal conditions for the food type. In some embodiments, a sensor may be associated with the food being cooked (e.g., a thermometer or thermocouple in contact with the food) and information or data from the sensor associated with the food may be used to determine or adjust the optimal conditions. If the present conditions do not match the optimal conditions, then various features of the smoker can be modified to adjust the conditions of the smoker. In some embodiments, the smoker automatically adjusts based on sensor data to maintain desired cooking conditions.

In an example embodiment, the smoker 100 may include a sensor on the exterior wall 105 to measure the exterior conditions of the smoker. In yet another embodiment, the smoker may include a thermal imaging mechanism on the interior wall 110 to detect heat patterns within in the smoker. In another example embodiment, the smoker 100 may include one or more associated food temperature sensors that measure the internal temperature of the food and/or the surface temperature of the food.

The smoker 100 includes the food platform 130 for holding the food during the cooking process. The food platform 130 may be of any suitable structure for smoking and grilling food, such as, a grill grate. In one embodiment, the food platform 130 can be moved closer to or further from the heat source. In some embodiments, the food platform 130 has an automated height adjustment mechanism 132 for moving the food platform 130 toward or away from the heat source. The food platform 130 can be moved using the height adjustment mechanism 132 based on instructions from a control device 150 associated with the smoker and/or by the user using an application on a mobile device that is in communication with the smoker. In some embodiments, the food platform 130 moves automatically during the cooking process based on the cooking conditions in the smoker and the condition of the food.

In some embodiments, the smoker may include a spit instead of, or in addition to the food platform 130. In some embodiments, the smoker body includes at least one hole through which an end of the spit extends. In one embodiment, the smoker container body includes two holes on opposite sides of the smoker just below the level of the grill plate that can be opened and closed to switch between rotisserie and smoking modes. A spit can be inserted through the holes projecting several inches from one hole on the outside of the smoker, where it can be attached to a motor. In another embodiment, the smoker container body includes one hole through which one end of the spit projects and a mounting fixture on an interior wall of the smoker body opposite the one hole. The mounting fixture holds the opposite end of the spit. The motor may be electrically powered an allow for variable speeds for rotating the spit. In some embodiments, the smoker may include a mechanism for automatically rotating the spit. In some embodiments, the control device 150 may control a rotation speed of the spit.

In some embodiments, a wood platform 135 is located below the food platform 130 as shown in FIG. 1A. In some embodiments, the wood platform 135 is configured to support a plate, basket, or other suitable container for holding wood and one or more water containers 137 for holding water to provide moisture in the smoker container. In an example embodiment, there is a water container 137 on each side of the wood on the wood platform 135. In other embodiments, there may be fewer or more water containers on the wood platform 135. In some embodiments, wood and water may be supported on different platforms at different heights in the smoker. In a further embodiment, a water spraying mechanism is included in the smoker container. The water spraying mechanism may be a dispenser that can spray, squirt, and/or mist water or any other fluid. The water spraying mechanism may be coupled to the interior wall 110. In an example embodiment, the water spraying mechanism sprays water on to the food. Providing moisture to the food allows it to absorb more smoke. Typically, the smoke flows past the food and does not actually touch the food. The smoke makes a small boundary layer around the meat, and adding moisture to the food promotes the smoke sticking to the food, allowing the food to more effectively absorb the smoke.

Under the wood platform 135, the smoker includes the heat source 140 for heating the wood. In some embodiments, the heat source 140 may be used for cooking the food directly when grilling. The heat source 140 may be any type of appropriate heat source, such as, coal, wood, one or more propane burners, or one or more natural gas burners.

In some embodiments, one or more air flow control mechanism are located in a lower portion of the smoker. In an example embodiment, the air flow control mechanism 145, located at the bottom of the smoker 100, is an air vent and operates as an air inlet to allow air into the smoker 100. In one embodiment, the air flow control mechanism 145 can be configured by a user or by an automated program to manage air flow in the smoker container during the cooking process. In an example embodiment, the air flow control mechanism 145 can be configured based on instructions from a control device 150 associated with the smoker, via an application on a mobile device, and/or via a user interface on the smoker 100. In some embodiments, the air flow control mechanism 145 may be automatically configured based on the internal conditions of the smoker container during the cooking process to continually ensure optimal cooking conditions in the smoker 100. In an example embodiment, the surface area of the opening of the air vent of the air flow control mechanism 145 can be configured by a user or by an automated program to manage air flow in the smoker container during the cooking process. Other exemplary embodiments of an air flow control mechanism are described below in relation to FIGS. 2A, 2B, 2C, 2D, 2E, 2F, and 2G.

In an example embodiment, automated control of the smoker temperature is provided by controlling the air flow control mechanism 145 using data received from the sensors (temperature measurements) within the smoker. A proportional-integral-derivative (PID) controller can be used for automated control of the air flow control mechanism 145 in the smoker. In some embodiments, the control device 150 may include a PID controller. An example PID controller is a control loop feedback mechanism that may calculate an error value as the difference between a measured variable and a desired data point.

Figure 1B:
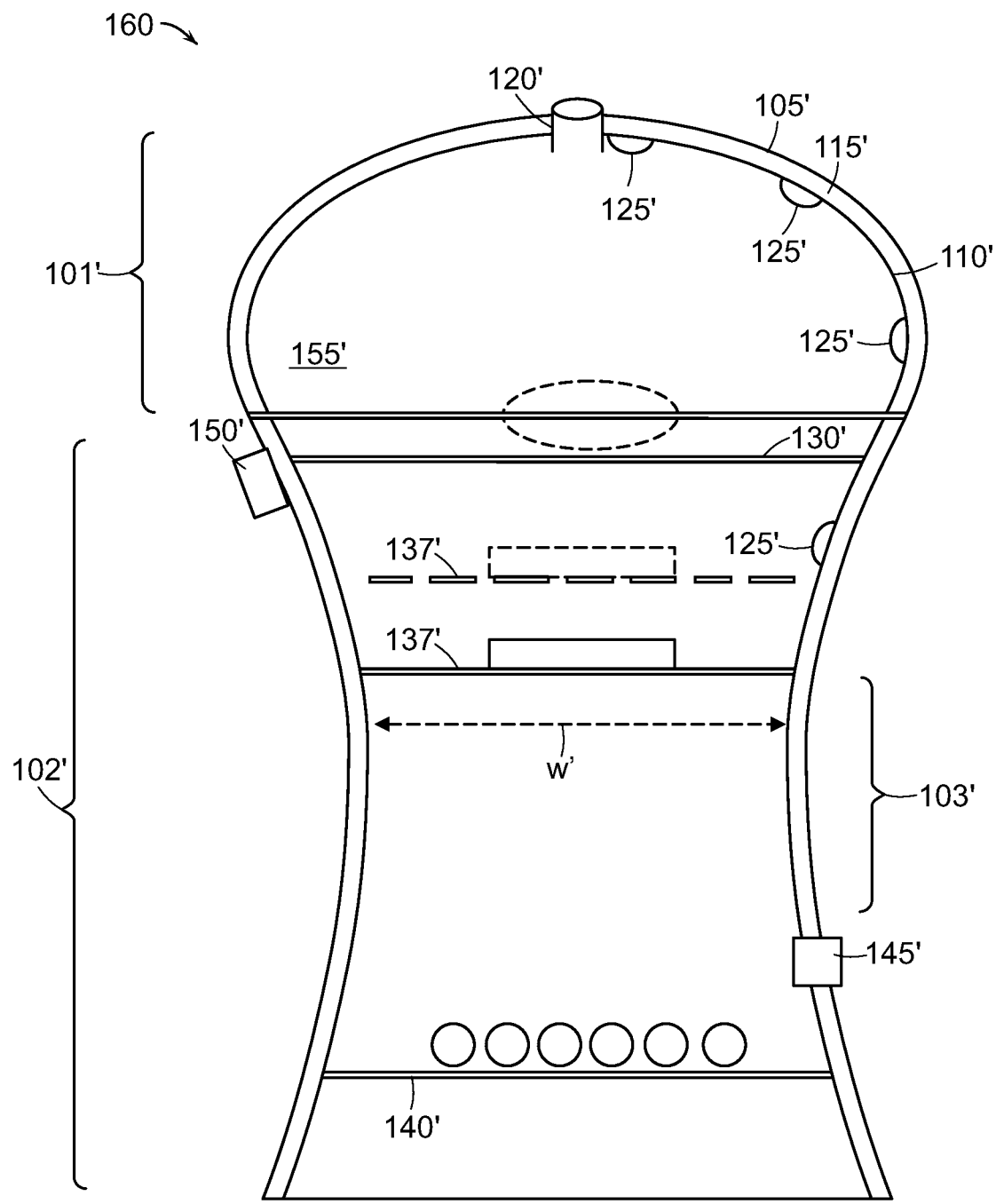
FIG. 1B schematically depicts a smoker, according to another embodiment.

FIG. 1B schematically depicts a smoker 160, according to another exemplary embodiment. Similar to smoker 100, smoker 160 includes an exterior wall 105' and an interior wall 110', which define an insulating layer 115' (e.g., an air layer or a layer of insulation), an upper air vent 120', sensors 125', a food platform 130', a heat source 140', and an air flow control mechanism 145'.

In some embodiments, the smoker may include a heat source 140' in the form of fuel basket. In an example embodiment, the fuel basket may be made of metal or any other suitable material to hold fuel, such as coal, to provide heat in the smoker. In some embodiments, the fuel basket is configured as a circular mesh basket with handles extending from the top of the fuel basket, so that it is easy for a user to remove or insert the fuel basket in the smoker base.

In some embodiments, the fuel basket or scaffold 170 may be made of the same type of wood that may be used for smoking. For example, a prepacked, one-time-use fuel scaffold may be provided to a user, where the scaffold contains an amount of coal and wood for a smoker. The prepacked scaffold may be provided in different sizes with different amounts of coal and wood based on a desired cook or smoke time. The wood used to make the fuel scaffold and provided with the fuel scaffold may include a number of types of wood based on smoking preferences for different types of food. As a non-limiting example, mesquite wood may be preferred for smoking beef brisket, while fruit woods, like apple or cherry, may be preferred for cooking chicken.

The smoker 160 also includes a water container platform 137'. The water container platform 137' can be placed at different heights within the smoker 160 as illustrated by the dotted line representation of an alternate position in FIG. 1B. In an example embodiment, the water container platform 137' made of ceramic. In an example embodiment, the water container platform 137' is a solid plate. The solid ceramic plate 137' may act as a heat sink. The closer the ceramic plate 137' is to the food and the food platform 130', the more heat is provided to the bottom portion of the food. In some embodiments, a container, bowl or pan to hold water is integrated into the water container platform 137'. That is, the water container and the platform 137' may be a single unit. The water container may also be made of ceramic. Exemplary embodiments of the water container platform 137' are described below in relation to FIGS. 3A, 3B, and 3C. In some embodiments, the platform is ceramic and the water container is not ceramic (e.g., metal). In some embodiments, the platform is not ceramic (e.g., a metal grate) and the water container is ceramic.

Further, the water container platform 137' provides separation between the food and the heat source in the smoker. That is, the bottom portion of the food is not directly exposed to the heat source, as is the case in conventional smokers. Additionally, for embodiments in which the smoker body includes ceramic materials, the food on grill plate 130' is surrounded by ceramic on all sides, via the water container platform 137' at the bottom side of the food, and the ceramic surfaces of the body of the smoker on the other sides of the food. This feature also helps eliminate the need for flipping the food during the smoking process. To achieve an optimal cooking environment, one of the goals is to provide a smoker where a user does not have to open the smoker during the smoking process, so that the internal cooking environment of the smoker can be automatically controlled and managed, and there is no introduction of external elements (like air) to the smoker. Reducing or eliminating the need to flip the food during the smoking process avoids disturbances to the system associated with opening the smoker.

The various components of the smoker 160 function similar to the components of smoker 100. The shape of smoker 160 is such that the top portion of the smoker 160 is wider than a middle portion of the smoker 160. The food platform 130' is located near a narrowed portion 102' of the smoker 160.

Although the narrowed part 103 in smoker 100 and the narrowed part 103' in smoker 110' each have a substantially hyperboloid shape with waist below with food platform 130, 130', one of ordinary skill in the art, in view of the present disclosure, will appreciate that some in some embodiments, the narrowed part of the container body has a shape similar to that of a hyperboloid, but not strictly hyperbolic, such as an hourglass shape.

Additionally, in some embodiments, the air flow control mechanism 145' is located in a side wall of the smoker towards the bottom portion of the smoker. The air flow control mechanism 145' may be located closer to the heat source 140' so that air flow can be controlled at the heat source 140'. Exemplary embodiments of the air flow control mechanism 145' are described below in relation to FIGS. 2A, 2B, 2C, 2D, 2E, 2F, and 2G.

In some embodiments, an upper portion 101, 101' of the smoker 100, 160 functions as a lid to the smoker (e.g., lid 155 of smoker 100 and lid 155' of smoker 160). That is, the upper portion 101, 101' of the smoker is coupled to or coupleable to the lower portion 102, 102' of the smoker such that lifting, tilting or removing the lid 155, 155' provides access to the interior of the smoker (e.g., access to the food being cooked). In some embodiments, the lid 155, 155' is coupled to the smoker 110, 160 by a hinge. In some embodiments, the lid of the smoker 100, 160 may be completely detachable, and is not coupled to the smoker using hinges. In some embodiments, the lid 155, 155' includes a handle on the exterior surface. In some embodiments, the smoker 100, 160 may be provided with multiple lids where each lid has a different size and/or shape. Using a lid of different size or shape on the smoker may allow a user to change the heat profile and the smoke flow in the smoker and/or to accommodate different food sizes and shapes (e.g., whole turkey, brisket, sausages). In some embodiments, the lid of the smoker may include hooks on the interior surface of the lid, from which food can be hung into the smoker.

In exemplary embodiments, the smoker 100, 160 may also include an ignition mechanism at the bottom of the smoker. The ignition mechanism may function, when actuated or operated by a user manually or automatically via the control device 150, 150', to ignite a fire in the smoker via the heat source 140, 140'. The ignition mechanism may be a battery operated heating coil or an electromechanical flame ignition device, which may operate on a principle similar to that of an automatic lighter. In this embodiment, a battery powered current drives a motion device (e.g., a servo) to release gas and create a spark, thus generating a fire that provides enough initial heat energy to cause the fuel source (e.g., coal) to undergo combustion without the need for additional heat. The motion device then moves in order to stop the release of gas in the smoker. This example ignition system may cover the base area of a fuel basket In some embodiments, the weight of the smoker may fall in a range of approximately 150 lbs. to 350 lbs. In some embodiments, a weight of the smoker may fall in a range of 175 to 225 lbs. In some embodiments, the smoker weighs approximately 200 lbs.

In an exemplary embodiment, the waist w, w' of the narrowed part 102, 102' of the smoker body is approximately 8 inches in radius. In an exemplary embodiment, the food platform 130, 130' (grill plate) is approximately 12 inches in radius. In an exemplary embodiment, the base/bottom of the smoker is approximately 14 to 15 inches in radius. In an exemplary embodiment, the container to hold water that is coupled to or placed on the platform 137' is approximately 5 to 6 inches in radius. In an exemplary embodiment, an opening of the upper air vent 120, 120' is approximately 1 inch in diameter. In an exemplary embodiment, an opening of the lower air vent, which is part of the air flow control mechanism 145, 145', is approximately 1 inch in diameter. In an exemplary embodiment, the heat source platform 140, 140' or container is approximately 3 to 5 inches in radius. In an exemplary embodiment, the height of the smoker 100, 160 is approximately 40 to 45 inches.

In some embodiments, the waist w, w' of the narrowed part of the smoker body is 6-10 inches in radius. In some embodiments, the food platform is 9-15 inches in radius. In some embodiments, an opening of the lower air vent is between 0.5 to 1.5 inches in diameter.

In some embodiments, a ratio of the radius of the smoker body at the food platform to a radius of the smoker body at the waist falls in a range of 1.2 to 1.8. In some embodiments, a ratio of the radius of the smoker body at the food platform to a radius of the smoker body at the waist falls in a range of 1.4 to 1.6. In some embodiments, a ratio of the radius of the smoker body at the food platform to a radius of the smoker body at the waist is approximately 1.5.

Figure 2B:
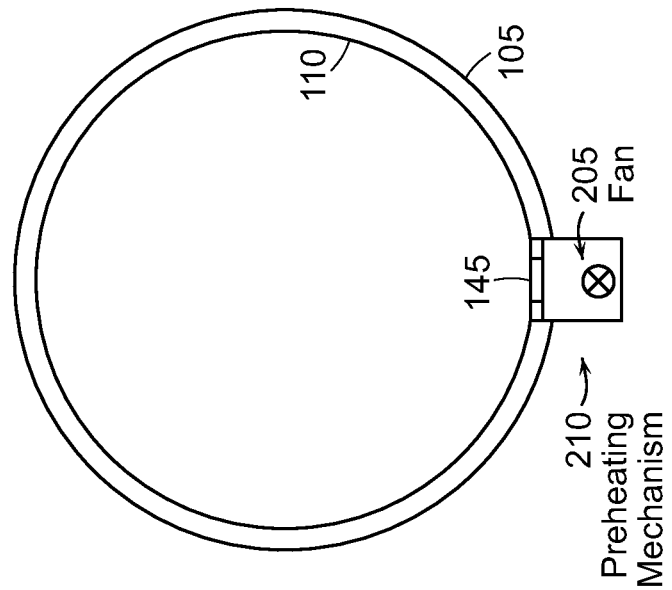
FIG. 2B schematically depicts a top view of the air flow control mechanism for a smoker of FIG. 2A.
Figure 2A:
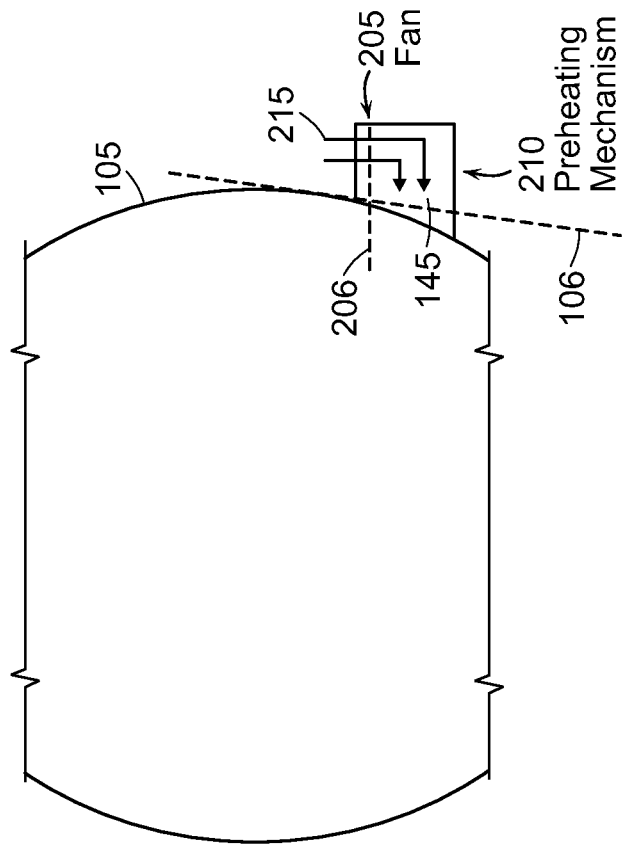
FIG. 2A schematically depicts a side view of an air flow control mechanism for a smoker, according to an embodiment.

FIG. 2A schematically depicts a side view of an air flow control mechanism for a smoker, according to an example embodiment. FIG. 2B schematically depicts a top view of an air flow control mechanism for a smoker, according to an example embodiment. In an example embodiment, the air flow control mechanism includes a preheating mechanism 210 with a horizontal fan 205 attached. The horizontal fan 205 may be configured to pull in air through the preheating mechanism 210, as shown by air flow 215 in FIG. 2A. The horizontal fan 205 may be turned on or off via the control device 150, 150' to control air flow into the smoker. In an example embodiment, the horizontal fan 205 is a single-speed fan, and the air flow is controlled by activating or deactivating the fan 205. In alternative embodiments, the horizontal fan 205 is a variable-speed fan, and the air flow is controlled by controlling the operational speed of the fan. The preheating mechanism 210 may be coupled to an exterior wall 105, 105' of the smoker 100, 160 such that the air may flow through an air vent or air flow control mechanism 145, 145' over or through the preheating mechanism 210 to a bottom of the smoker 100, 160 and naturally rise up towards a top of the smoker 100, 160. The preheating mechanism 210 may be connected to the exterior wall 105, 105' of the smoker 100, 160 at the air flow control mechanism 145, 145' positioned towards the bottom or lower half of the smoker 100, 160. The control device 150, 150' and the air flow control mechanism may be used for automated control of a temperature profile over time within the smoker.

As illustrated in FIG. 2B, the preheating mechanism 210 may be positioned at the air flow control mechanism 145, 145' located partially within the exterior wall 105, 105' and substantially perpendicular to the interior wall 110, 110' of the smoker 100, 160, wherein the air flow control mechanism 145, 145' allows air flow 215 from the external environment to the interior of the smoker 100, 160. The horizontal fan 205 is included or coupled to the preheating mechanism 210 such that a plane of rotation 206 of horizontal fan 205 is parallel to the ground or to the bottom of the smoker 100, 160. In some embodiments, the plane of rotation 206 of the fan blades is substantially perpendicular to a wall of the container body where the vent is disposed (see dotted line 106 tangent to wall 105).

Figure 2C:
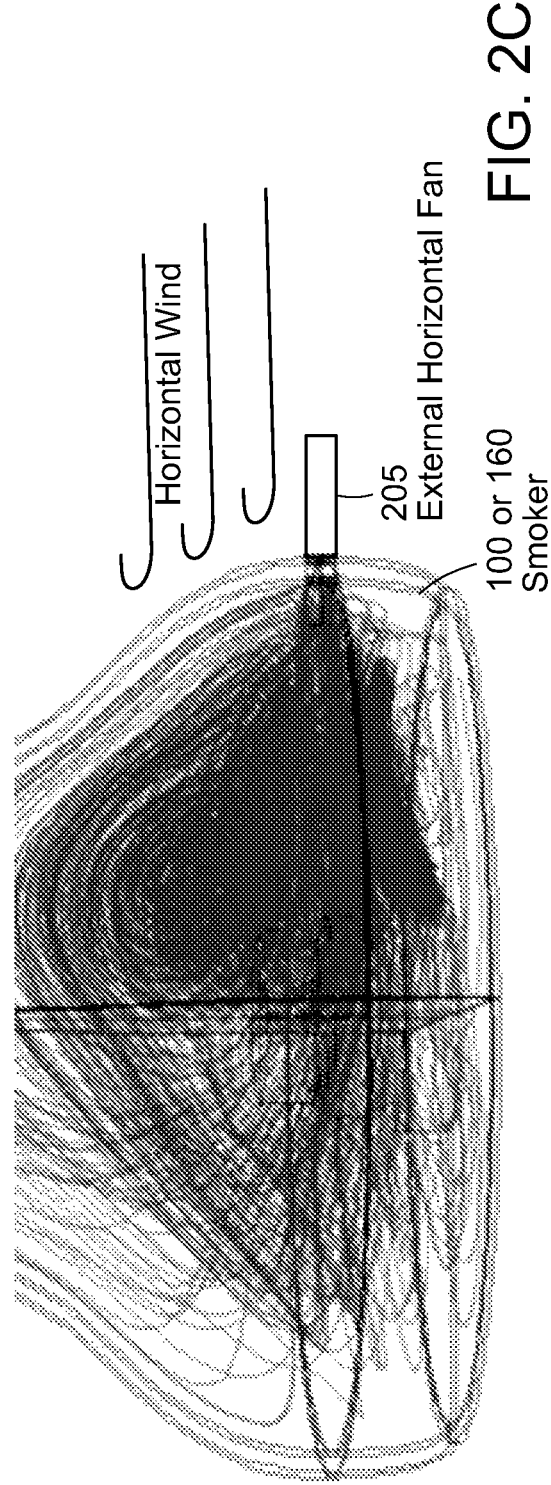
FIG. 2C schematically depicts a portion of a smoker with the air flow control mechanism of FIG. 2A when the mechanism is not actively drawing air into the smoker body.
Figure 2D:
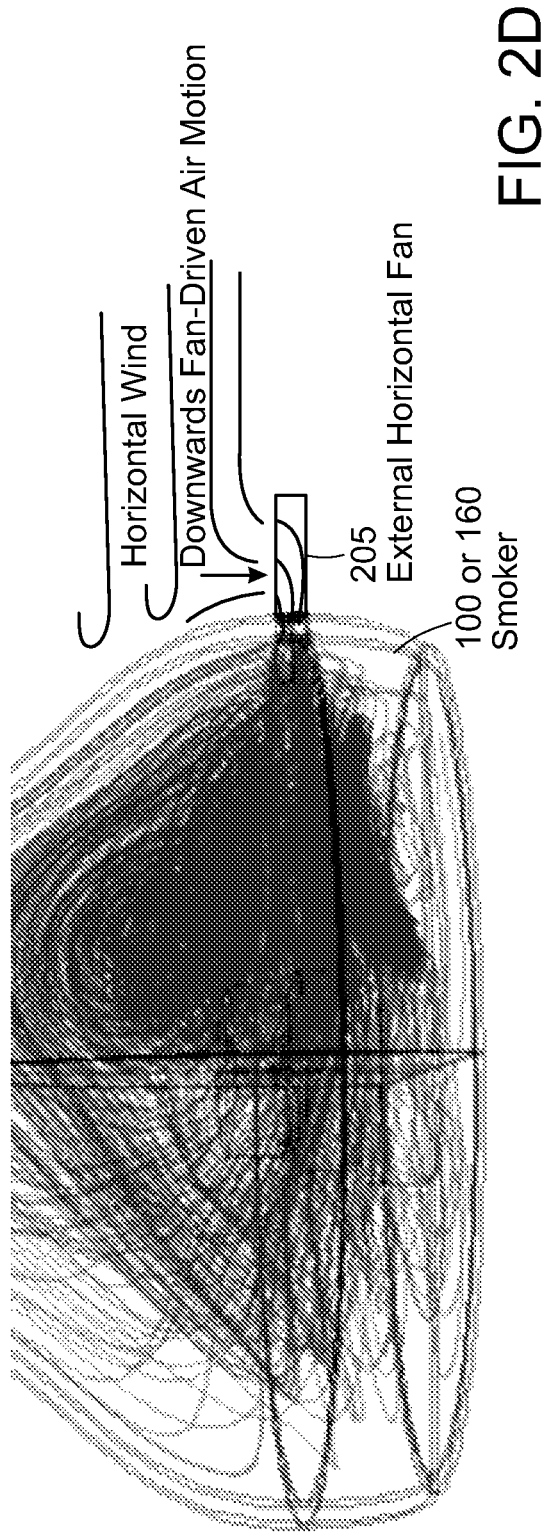
FIG. 2D schematically depicts the smoker with the air flow control mechanism of FIG. 2A when the mechanism is actively drawing air into the smoker body.

FIG. 2C schematically depicts a smoker when the fan of the air flow control mechanism is off or inactive, according to an example embodiment. FIG. 2D schematically depicts the smoker when the fan of the air flow control mechanism is on or active, according to an example embodiment. As shown in FIG. 2C, air from the outside does not enter the smoker 100, 160 when the horizontal fan 205 of the air flow control mechanism is off or inactive. However, as shown in FIG. 2D, air from the outside is pulled into the smoker by the air flow control mechanism when the horizontal fan 205 is active or turned on. Wind in the environment is mainly the horizontal movement of air which acts in parallel to the ground. When the horizontal fan 205 is inactive, environmental wind is unable to enter the smoker 100, 160 as it has negligible vertical velocity and cannot enter the horizontal fan 205 passageway. When the horizontal fan 205 active, it draws in and sucks air from the outside into the smoker as shown in FIG. 2D. There is no back flow of air from the smoker to the outside for the following reasons. The heat of the fuel source in the smoker warms the smoker air causing it to rise and providing space for more cold air to enter via the air flow control mechanism. This drives air away from the horizontal fan 205 and towards the smoker fuel source. The consumption of oxygen in the combustion reaction of the fuel source also leads to oxygen deprived air and draws more oxygen-rich air from the horizontal fan passageway towards the fuel source. In this manner, negligible amounts of air flows out through the horizontal fan 205 and into the external environment. In FIGS. 2C and 2D, the thin lines represent airflow within the smoker.

Figure 2E:
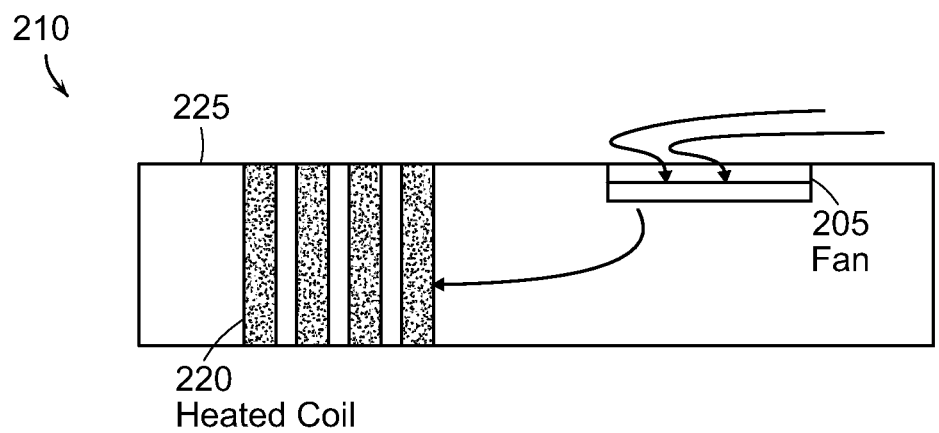
FIG. 2E schematically depicts a side view of an air flow control mechanism with a preheating mechanism, according to an example embodiment.
Figure 2F:
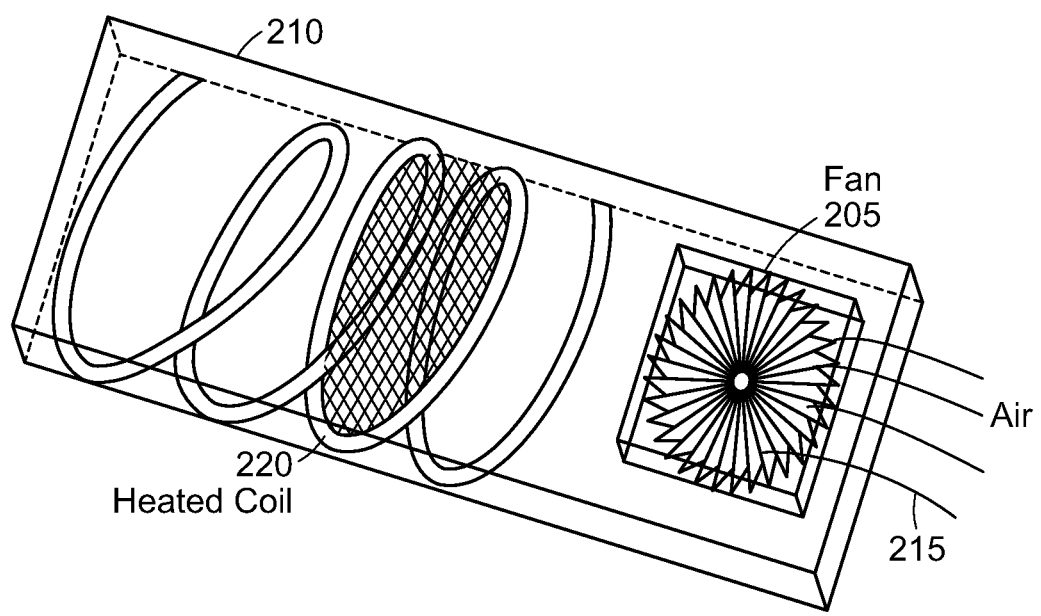
FIG. 2F schematically depicts a perspective view of the air flow control mechanism with the preheating mechanism.
Figure 2G:
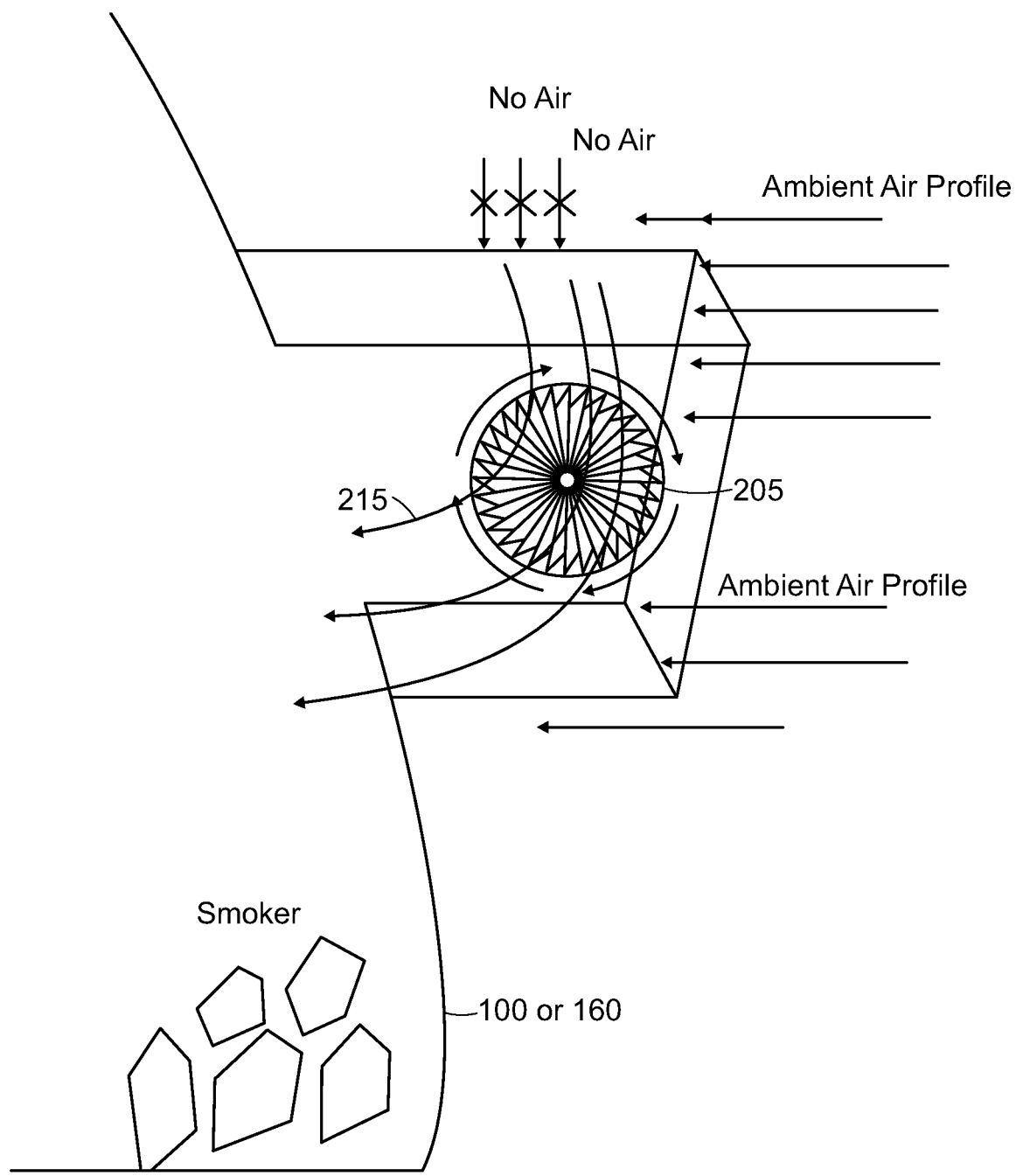
FIG. 2G schematically depicts a perspective view of an air flow control mechanism connected to a body of a smoker.

FIG. 2E schematically depicts a side view of the air flow control mechanism with a preheating mechanism 210, according to an example embodiment. FIG. 2F schematically depicts a perspective view of the air flow control mechanism with the preheating mechanism 210, according to an example embodiment. In FIGS. 2E and 2F, the smoker container body, to which the preheating mechanism is connected, is omitted. FIG. 2G schematically depicts another perspective view of the air flow control mechanism with the preheating mechanism 210, according to an example embodiment. In an example embodiment, the pre-heating mechanism 210 includes of a heated coil 220 wrapped around an inlet air shaft 225. The heated coil 220 is electronically powered. In some embodiments, the heated coil 220 contains a grid that may be used both as an inlet air filter and also as a barrier for any pieces of fuel (e.g., coal or wood) that may slide into the air shaft (in order to not damage the fan). Both the fan 205 and the heated coil 220 can receive power from the same power source. As shown in FIG. 2G and as described above, the horizontal fan 205 pulls in air (air flow 215) from the outside into the air inlet shaft of the air flow control mechanism to provide air to the smoker 100, 160.

FIG. 3A schematically depicts a top view of a water container platform 137, 137' for a smoker, according to an example embodiment. In some embodiments, the water container platform comprises a ceramic. In some embodiments, the water container platform comprises a ceramic plate. The water container platform 137, 137' is configured to be supported by the smoker container body at different heights within the smoker. The height of the water container platform 130, 137' can be altered inside of the smoker in order to change the internal airflow and heat profile of the smoker. As shown in FIG. 3A, the water container platform 137, 137' has a central portion 308 and four peripheral portions 310, each connected to the central portion 308 by one or more hinge mechanisms, that allows it to be positioned at two different heights within the smoker. In other embodiments, the water container platform 137, 137' may have fewer or more peripheral portions 310 (for example, the water container platform 137, 137' illustrated in FIGS. 3B and 3C has three peripheral portions 310). In other embodiments, the water container platform 137, 137' may be capable of being positioned at more than two different heights within the smoker. In some embodiments, the water container platform 137, 137' is configured to support a container to hold water to provide humidity in the smoker. In some embodiments, the water container may be included in, attached to, or integrated into the water container platform itself.

FIG. 3B schematically depicts a top view of the water container platform 137, 137' in a first configuration with the peripheral portions 310 folded out to be supported in a first position at a first height in the smoker, according to an example embodiment. FIG. 3C schematically depicts a top view of the water container platform 137, 137' in a second configuration with the peripheral portions 310 folded in to be supported at a second position at a second height, which is larger than the first height, in the smoker, according to an example embodiment. As shown in FIGS. 3B and 3C, in an example embodiment, the smoker includes sets of edges or ridges 315 protruding or extending from the interior wall of the smoker. The smoker may include the ridges 315 at two different heights within the smoker. In some embodiments, the water container platform 137, 137' includes of a central portion (e.g., a central part) whose radius is smaller than the internal radius of the smoker at a first position. In some embodiments, the water container platform 137, 137' includes three peripheral portions 310 (e.g., foldable edges), attached to the circular part 137, 137' via one-way hinges. That is, the peripheral portions 310 can only fold in one direction, but are not allowed to fold in the opposing direction. The one-way hinges prevent the peripheral portions 310 from folding against the central portion 308 when the water container platform 137, 137' is in a first configuration with the peripheral portions 310 supported by the internal ridges 315 of the container body at a first height. The water container platform 137, 137' thus remains suspended as the one-way hinges stop the peripheral portions 308 from further folding. To move the water container platform to a second position with a second height lower than the first height, the peripheral portions 310 can be folded in to form a second configuration, and positioned onto internal ridges 315 at a second position with a second height lower than the first height. In some embodiments, the water container platform 137, 137' may be flipped over with the peripheral edges 310 are folded in, and placed onto the ridge 315 at the second position.

As shown in both FIG. 3B (for example the first configuration for the first position of the ceramic plate 137, 137') and FIG. 3C (for example the second configuration for the second position of the ceramic plate 137, 137'), air and smoke can flow (illustrated by arrows 320) around the plate from the bottom of the smoker towards the top of the smoker and the food support surface. As illustrated in FIGS. 3B and 3C, more air may be able to flow around the ceramic plate 137, 137' in the first configuration than in the second position because the edges 310 are not folded in. While in the second (FIG. 3C), less air may be able to flow around the ceramic plate 137, 137' because the edges 310 are folded, and the area between the ceramic plate 137, 137' and the interior wall of the smoker is less than that of the configuration in FIG. 3B. In this manner, the heat profile, and air and smoke flow in the smoker can be changed by positioning the ceramic plate 137, 137' at different positions within the smoker.

Figure 4A:
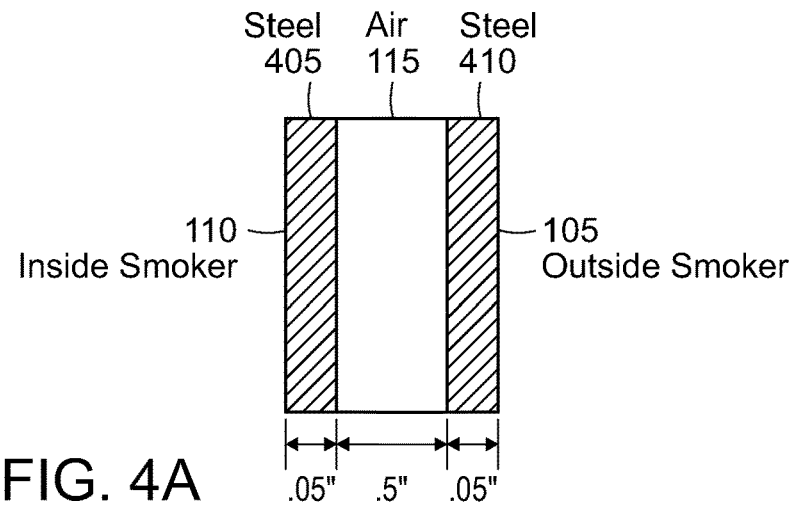
FIG. 4A schematically depicts a section of a multi-layer wall of a container body of a smoker that includes an air gap insulating layer, according to an embodiment.

FIG. 4A schematically depicts materials for a layered wall smoker, according to an example embodiment. In this embodiment, the layered wall of the smoker comprises a first metal layer 405 (e.g., a steel layer) that forms the interior wall 110, 110' of the smoker, a second metal 410 (e.g., steel) that forms the exterior wall 105, 105' of the smoker, and an air layer 115 is formed between the two metal layers. In some embodiments, one or both of the metal layers 405, 410 are made of stainless steel. In other embodiments, one or both of the metal layers may include any other metal with sufficiently low heat conductance. In an example embodiment, the first and second metal layers are 0.05 inch thick steel, and there is a 0.5 inch gap between the metal layers forming the air layer. In some embodiments, one or both of the first and second metal layers have a thickness falling in a range of 0.03 to 0.07 inches. In some embodiments, the air gap between the metal layers falls in a range of 0.3 and 0.7 inches.

Figure 4B:
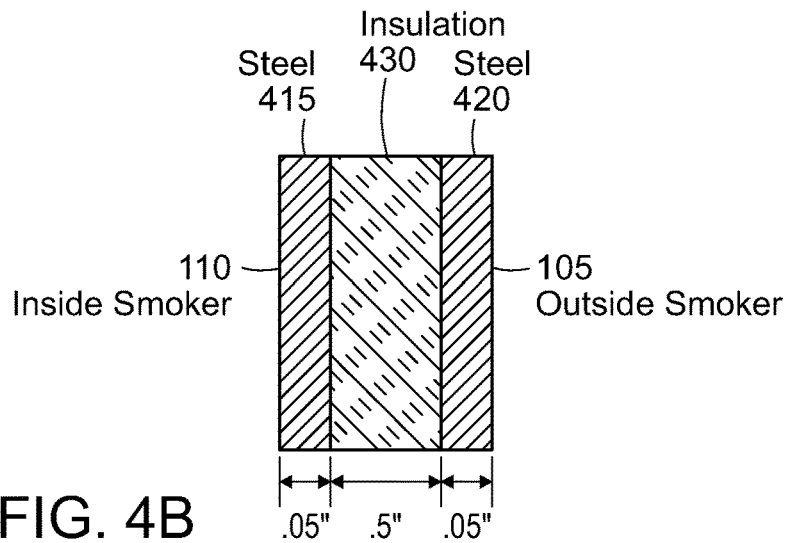
FIG. 4B schematically depicts a section of a multi-layer wall of a container body of a smoker that includes a layer of insulation, according to an embodiment.

FIG. 4B schematically depicts materials for a layered wall smoker, according to another example embodiment. In this embodiment, the layered wall of the smoker includes a first metal layer 415 (e.g., steel) that forms the interior wall 110, 110' of the smoker, a second metal layer 420 (e.g., steel) that forms the exterior wall 105, 105' of the smoker, and a layer of insulation 430 between two metal layers. In some embodiments, the metal layers 415, 420 include stainless steel. In other embodiments, the first metal layer and the second metal layer can include any other metal with low heat conductive. In an example embodiment, the layer of insulation 430 is made of a lightweight fibrous insulation material. In an example embodiment, the first metal layer 415 and the second metal layer 420 are each 0.05 inches thick, and the layer of insulation is 0.5 inches thick. In some embodiments, the layer of insulation has a thickness falling in a range of 0.3 and 0.7 inches.

Figure 4C:
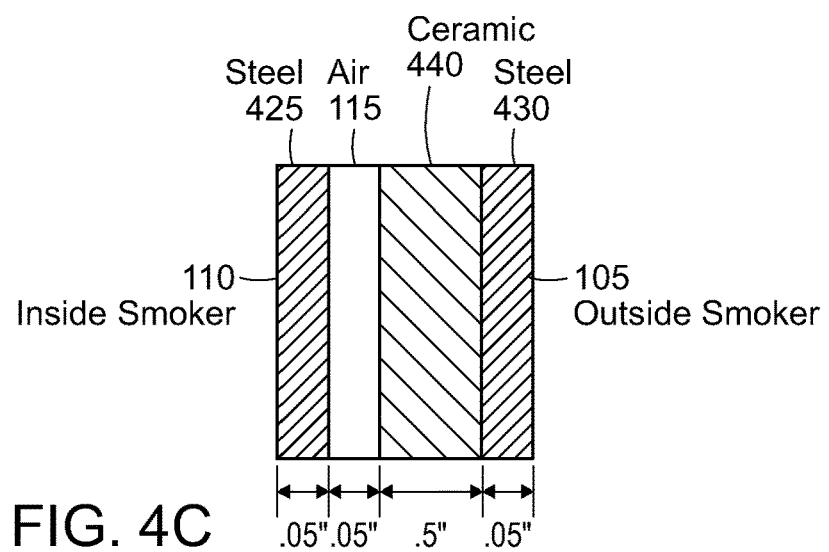
FIG. 4C schematically depicts a section of a multi-layer wall of a container body of a smoker that includes an air gap insulating layer and a ceramic insulating layer.

FIG. 4C schematically depicts materials for a layered wall smoker, according to yet another example embodiment. In this embodiment, the layered wall of the smoker includes a first metal layer 425 (e.g., steel) that forms the interior wall 110, 110' of the smoker, a second metal layer 430 (e.g., steel) that forms the exterior wall 105, 105' of the smoker, a layer of ceramic 440 adjacent to the second metal layer 430, and an air layer 115 formed between the ceramic layer 440 and the first metal layer 425. In some embodiments, the first and second metal layers 415, 420 are made of stainless steel. In other embodiments, the first metal layer and the second metal layer may include any other metal with sufficiently low heat conductance. In an example embodiment, the first metal layer 425 and the second metal layer 430 are each 0.05 inches thick, the ceramic layer is 0.5 inches thick, and the air passage 115 is 0.05 inches thick. In some embodiments, the ceramic 440 may not be attached to the second metal later 430, but instead may be in the form of ceramic plates inserted into the gap between the first metal layer 425 and the second metal layer 430. In some embodiments, the ceramic plates may be inserted between the metal layers in only some portions of the smoker container body (e.g., in part or all of the lower body portion). In some embodiments, the ceramic layer or ceramic plate has a thickness falling in a range of 0.3 and 0.7 inches.

In some embodiments, a coating may cover part or all of an outer surface of the container body. In some embodiments, a coating may cover part or all of an inner surface of the container body that is exposed to the smoke.

Exemplary embodiments may employ a multi-wall or layered wall structure for only a portion of the smoker, rather than the entire smoker body. Additionally, exemplary embodiments may employ a combination of embodiments described in connection with FIGS. 4A, 4B, and 4C in a multi-wall or layered wall structure for the smoker.

Figure 5:
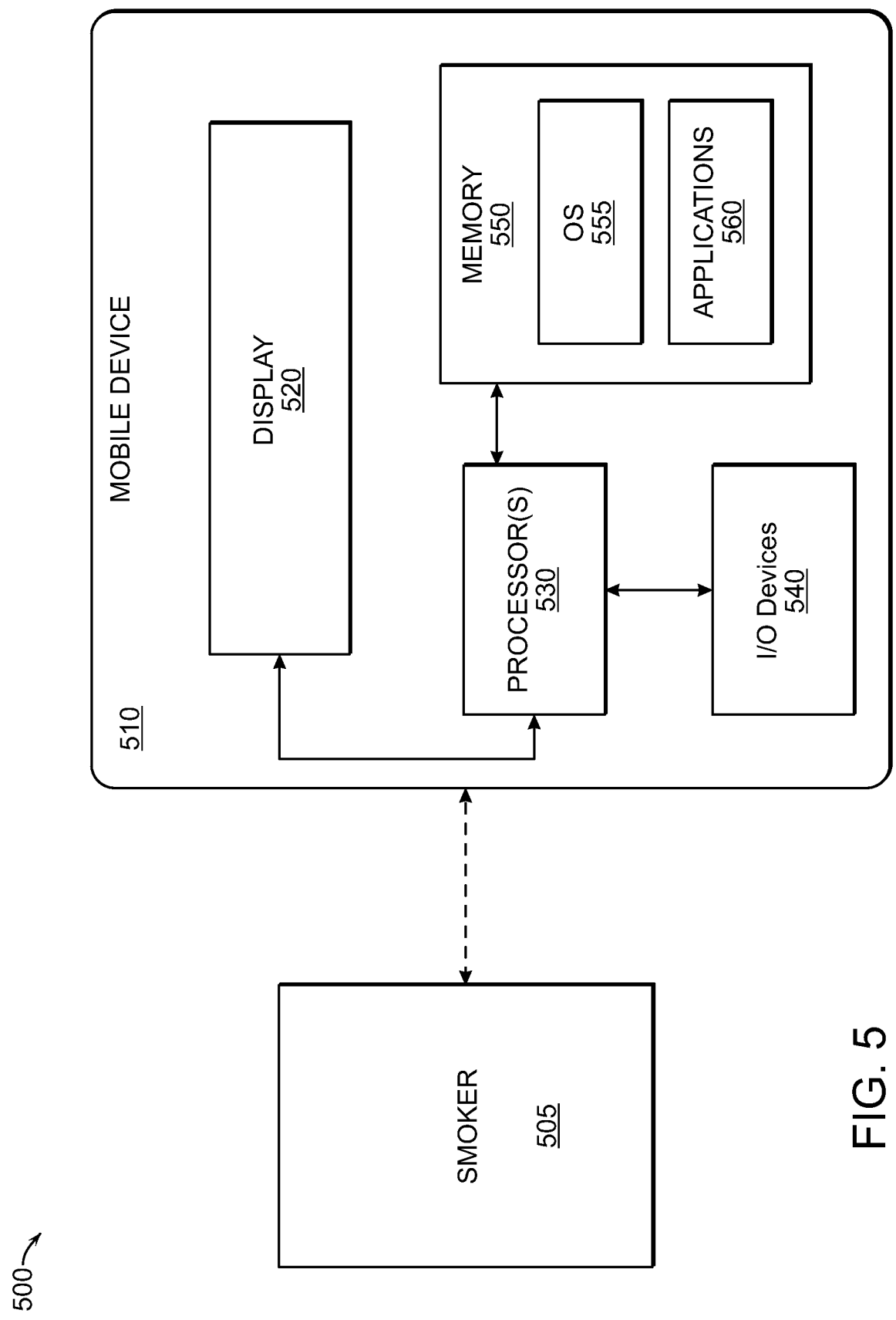
FIG. 5 schematically illustrates a system for remotely controlling a smoker, according to an embodiment.

FIG. 5 illustrates an example system 500 for remotely controlling a smoker 505 (e.g., smoker 100, 160) using mobile device 510. In an example embodiment, the mobile device 510 includes a display 520, one or more processors 530, I/O devices 540, and a memory 550. The processors 530 may be any of a variety of different types of commercially available processors suitable for mobile devices (for example, NVIDIA System on a Chip (SoC) multicore processors along with graphics processing units (GPU) devices, such as the Tegra K-1, XScale architecture microprocessors, Intel® Core™ processors, Intel® Atom™ processors, Intel® Celeron® processors, Intel® Pentium® processors, AMD processors, Qualcomm® Snapdragon processors, ARM® architecture processors, Microprocessor without Interlocked Pipeline Stages (MIPS) architecture processors, Apple® A series System-on-chip (SoCs) processors, or another type of processor). The memory 550, such as a Random Access Memory (RAM), an internal storage memory, an external storage memory, or other type of memory, is accessible to the processors 530. The memory 550 can be configured to store an operating system (OS) 555, as well application programs 560, such as an application for remotely controlling the smoker described herein. The processors 530 are coupled, either directly or via appropriate intermediary hardware, to the display 520 and to one or more input/output (I/O) devices 540, such as a keypad, a touch screen, a microphone, a speaker, and the like. The mobile device 510 is also capable of establishing Wi-Fi, Bluetooth, and/or Near Field Communication (NFC) connectivity.

The smoker 205 includes control device 150, 150' described in connection with FIGS. 1A and 1B. In an example embodiment, the control device 150 of the smoker 505 may include an embedded computer system programmed to function with the smoker and control various features of the smoker. The embedded computer system may include one or more microcontrollers, microprocessors, memory, display interface, input interface, and any other components necessary to perform the functionalities described herein. The display interface may be a touch-screen interface that may also function as the input interface. Alternatively, one or more buttons or a keypad may be included as the input interface in addition to the touch-screen input interface. The smoker 505 may also be capable of establishing Wi-Fi, Bluetooth, and/or NFC connectivity to wirelessly communicate to the mobile device 510. In an example embodiment, the control device 150, 150' may be any suitable control device that is configured to perform one or more functionalities described herein, including, but not limited to, receiving input data from sensors, controlling various features of the smoker, such as the fans and vents 178, and enabling wireless communications between the smoker and a user device. Example of suitable control devices include, but are not limited to, a RASPBERRY PI board from the Raspberry Pi Foundation and an ARDUINO board from Arduino LLC.

In one embodiment, the smoker 505 communicates data collected by sensors 125, 125' coupled to the smoker to the mobile device 510. The mobile device 510 may perform calculations using the sensor data to determine cooking conditions of the smoker. In some embodiments, the mobile device 510 is configured to communicate commands to the smoker 505 that adjust various features of the smoker. For example, the mobile device 510 may cause the smoker 505 to adjust the airflow into the smoker using the airflow control mechanism or move the food platform.

In some embodiments, the mobile device 510 automatically communicates to the smoker 505 to adjust the features of the smoker for optimal cooking conditions. In alternative embodiments, the processor coupled to the smoker 505 automatically adjusts the features of the smoker for optimal cooking conditions based on the collected sensor data. In some embodiments, a user can manually adjust various features of the smoker using the input interface on the smoker 505 or using the application on the mobile device 510.

Figure 6:
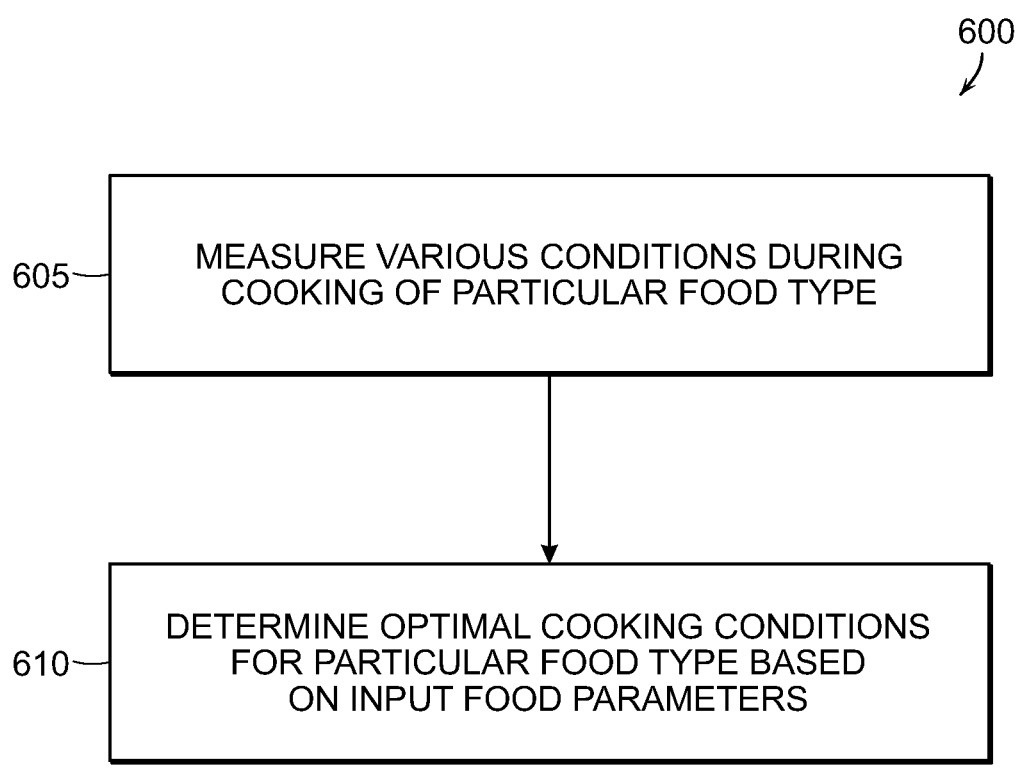
FIG. 6 is a flowchart depicting a method for determining optimal cooking conditions for food in a smoker, according to an embodiment.

FIG. 6 is a flowchart depicting method 600 for determining optimal cooking conditions for food in a smoker. At block 605, various conditions of the smoker are measured during the cooking process of different types of food. For example, data is collected from the sensors coupled to the smoker while cooking a beef brisket of a certain weight. Then data is collected from the sensors while cooking a pork shoulder of a certain weight. Additionally, data is collected from the sensors while cooking a beef brisket or a pork shoulder of a different weight. As such, data is collected while cooking various types of food of varying sizes, weights, and shapes. Additionally, data is collected while cooking with different types and amounts of wood, cooking for different lengths of time, and the like. After the food is cooked, the food is tested to ensure that it is properly cooked and the desired taste is achieved. The determination of desired taste may be based on known barbeque standards or guidelines (e.g., those of the Kansas City Barbeque Society). A relationship between the type of food, weight and other relevant food parameters and the corresponding cooking conditions is derived from the collected data. The derived relationship may consider some or all of the following as inputs: type of food, weight of food, size of food, shape of food, cut of meat, ambient, time of year, geographic location, atmospheric pressure, atmospheric humidity, and others.

At block 610, the optimal cooking conditions are determined for a particular type of food based on weight and possibly other relevant food parameters using the derived relationship. The determined optimal cooking conditions for a particular type of food based on width and size may include, but are not limited to, type of wood, amount of wood, type of heat source, humidity conditions, smoker temperature, food temperature, height of food platform, and length of time for cooking. In an example embodiment, a computer system 1100 described below may be used to derive the relationship. The data collected from the sensors and the optimal conditions determined for different types of food may be stored in a database in communication with the computing system 1100.

In an example embodiment, one or more components of the system described herein (e.g., smoker device 1020, server 1030, or user device 1010) predicts an amount of fuel needed to cook the food under optimal cooking conditions. Various factors are taken into consideration when determining the total energy lost during a smoking process to determine the amount of fuel needed to cook food, such as temperature change, radiation, water evaporation, cooking enthalpy, and convection flux. The energy lost may be determined using the below equation:

$$\text{Energy Lost} = V\rho c\Delta T + \varepsilon\sigma A(T_{smoker}^4 - T_0^4)t_{tot} + mL_v + H_{f\,products}^\circ - H_{f\,reactants}^\circ + h_c A(T_{smoker} - T_0)t_{tot}$$

where $V\rho c\Delta T$ indicates the change in temperature of the smoker body itself, internal air, food and wood with different coefficients of $\rho$, c and V for each of these components. The term $\varepsilon\sigma A(T_{smoker}^4 - T_0^4)t_{tot}$ represents the radiation in the smoker, $mL_v$ represents the water evaporation from the food where m is mass, $H_{f\,products}^\circ - H_{f\,reactants}^\circ$ is the cooking enthalpy change in the food, and $h_c A(T_{smoker} - T_0)t_{tot}$ represents convection flux from the smoker to the external ambient air. The variables are as follows: $\rho$ is density, T is temperature, $T_0$ is ambient temperature, t is time, V is volume, c is specific heat capacity, $h_c$ is heat transfer coefficient, A is surface area, $l_v$ is latent heat vaporization, $\varepsilon$ is surface emissivity, $\sigma$ is the Stefann-Boltzmann constant $5.67*10^{-8}$ W/m$^2$K$^4$, $S_{coal}$ is specific energy of coal, which is 30 MJ/kg. An example fuel prediction was calculated for the following conditions: 12-hour smoking process, internal smoker temperature of 225° F., 11 lbs. brisket, 2.5 kg of wood, 10° F. ambient temperature, and 70% efficiency. The fuel prediction for this particular scenario, using the above equation, was calculated to be 124.4 MJ (equivalent to 4.15 kg of coal). Predicting the fuel needed in this manner can prevent the fire or heat from dying out during a smoke.

Figure 7:
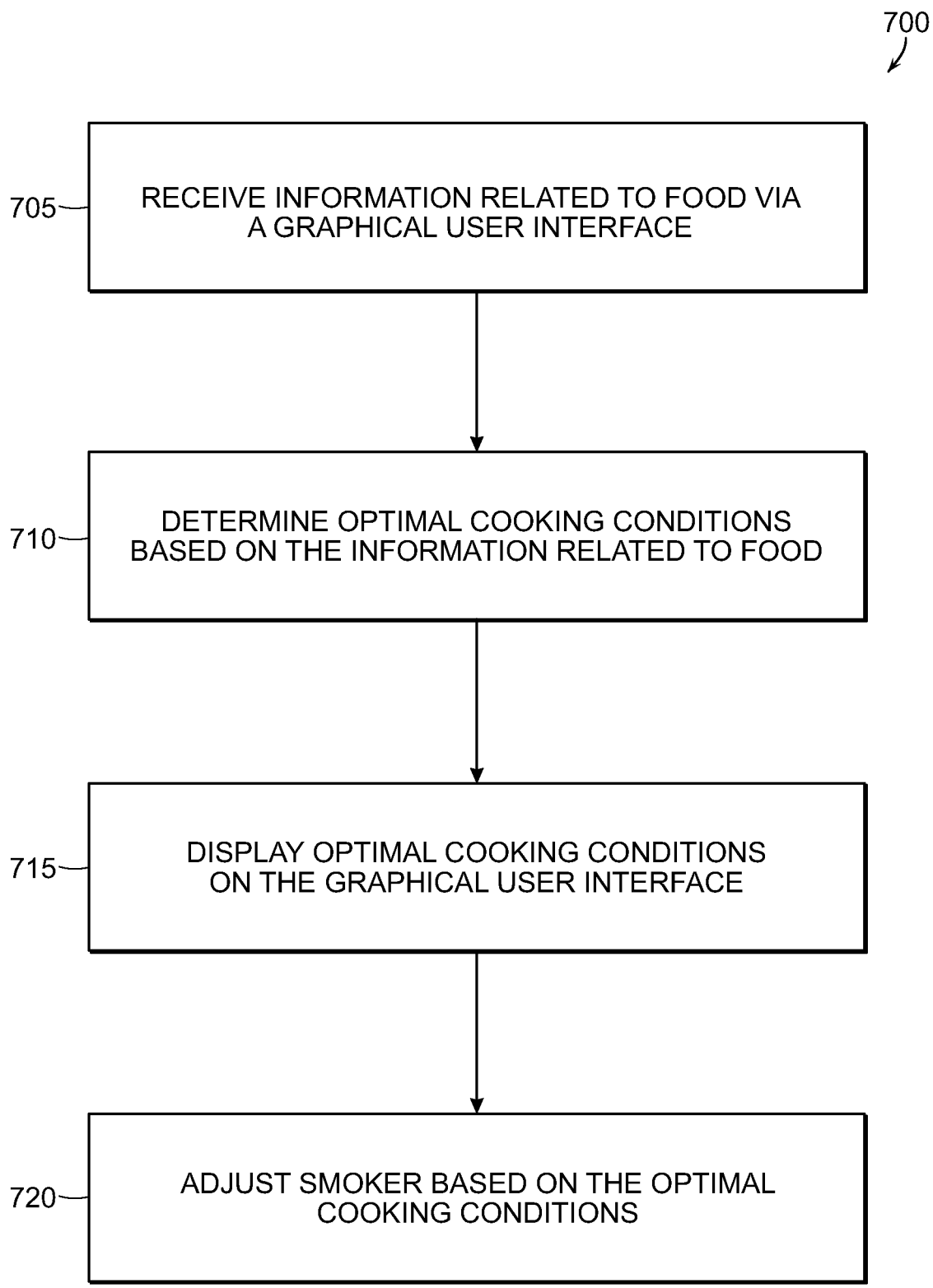
FIG. 7 is a flowchart depicting a method for controlling a smoker based on a particular food, according to an example embodiment.

FIG. 7 is a flowchart depicting method 700 for controlling a smoker based on a particular food. At block 705, information related to the food to be cooked (i.e., relevant input food parameters) is received via a user interface on the smoker or a mobile device. The information related to the food may include the type of food, weight and possibly other relevant input food parameters, which may include size and shape of the food, and the like. In some embodiments, information related to conditions external to the smoker may also be received, such as, weather conditions, geographic location, and the like. In some embodiments, the user can install an application on his or her mobile device for remotely controlling the smoker. The user may input the information using a graphical user interface of the application displayed on the mobile device.

At block 710, the optimal cooking conditions are determined based on the information received from the user. The optimal cooking conditions may be determined by inputting the information into an application programmed to include information about the relationship determined in method 600. In one embodiment, a control device of the smoker is programmed to calculate the optimal cooking conditions using the determined relationship based on the information received from the user. In one embodiment, the application installed on the mobile device is programmed to calculate the optimal cooking conditions using the determined relationship, which may be based on an algorithm or mathematical equation, based on the information received from the user. In another embodiment, the application causes the mobile device to communicate the information received from the user to a server, and the server is programmed to calculate the optimal cooking conditions using the algorithm or mathematical equation based on the information received from the user. In this case, the server communicates the optimal cooking conditions to the mobile device.

At block 715, the optimal cooking conditions are displayed on the graphical user interface on the mobile device. The optimal cooking conditions may include information such as type of wood, amount of wood, type of heat source, humidity conditions, optimal smoker temperature, optimal food temperature, height of food platform, length of time for cooking, and the like. In some embodiments, only some of the optimal cooking conditions are displayed (e.g., only those that require user involvement and are not controlled by the smoker itself like type of wood, amount of wood, and/or amount of coal).

At block 720, the smoker is automatically adjusted based on the optimal cooking conditions. As described herein, various features of the smoker may be automatically controlled to ensure optimal cooking conditions are maintained during the cooking process.

In one embodiment, the mobile device is in wireless communication with the smoker, and the smoker can be adjusted via the graphical user interface of the application installed on the mobile device. In this case, the user inputs the desired adjustments via the graphical user interface, most likely based on the optimal cooking conditions, and causes the smoker to adjust. In another embodiment, the user has an option to automatically adjust the smoker based on the optimal cooking conditions determined using the application. In this case, the graphical user interface displays a button, which when selected by the user, communicates to the smoker and adjusts the smoker to the optimal cooking conditions. In this embodiment, the user can adjust the smoker via a single action like selecting a button on the graphical user interface.

In an alternative embodiment, the mobile device is not in communication with the smoker, and the user manually adjusts the smoker based on the optimal cooking conditions displayed in the user interface of the mobile device. The smoker may include an input interface to adjust various features of the smoker, such as control device 150, 150'.

In some embodiments, the internal conditions of the smoker may be measured continuously during the cooking process. In some embodiments, the application may be programmed to continuously display the current and possibly past internal conditions of the smoker on the mobile device. Similarly, the optimal cooking conditions may also be continuously calculated and updated during the cooking process based on the amount of time already passed during the cooking process and the present conditions of the smoker. These optimal conditions may also be displayed on the user interface of the smoker control device and/or on the mobile device. Based on these conditions, the user may decide to adjust the smoker to ensure that optimal cooking conditions are maintained throughout the cooking process. Alternatively, the smoker may automatically adjust based on a comparison of the present cooking conditions and the optimal cooking conditions at any given time.

The method 700 is described above as being performed using a mobile device. Alternatively, method 700 may be performed using a control device 150 of the smoker, which may include a display and input interface on the smoker. For example, at block 705 the user may input information related to the food using the input interface on the smoker. At block 710, the processor coupled to the smoker may determine the optimal cooking conditions based on the information received from the user. At block 715, the optimal cooking conditions may be displayed on the display coupled to the smoker. In some embodiments, only some of the optimal cooking conditions are displayed (e.g., only those that require user involvement and are not controlled by the smoker itself like type of wood, amount of wood, and/or amount of coal). At block 720, the processor coupled to the smoker may automatically adjust the smoker based on the optimal cooking conditions. Alternatively, the user may manually adjust the smoker using the input interface on the smoker.

Figure 8:
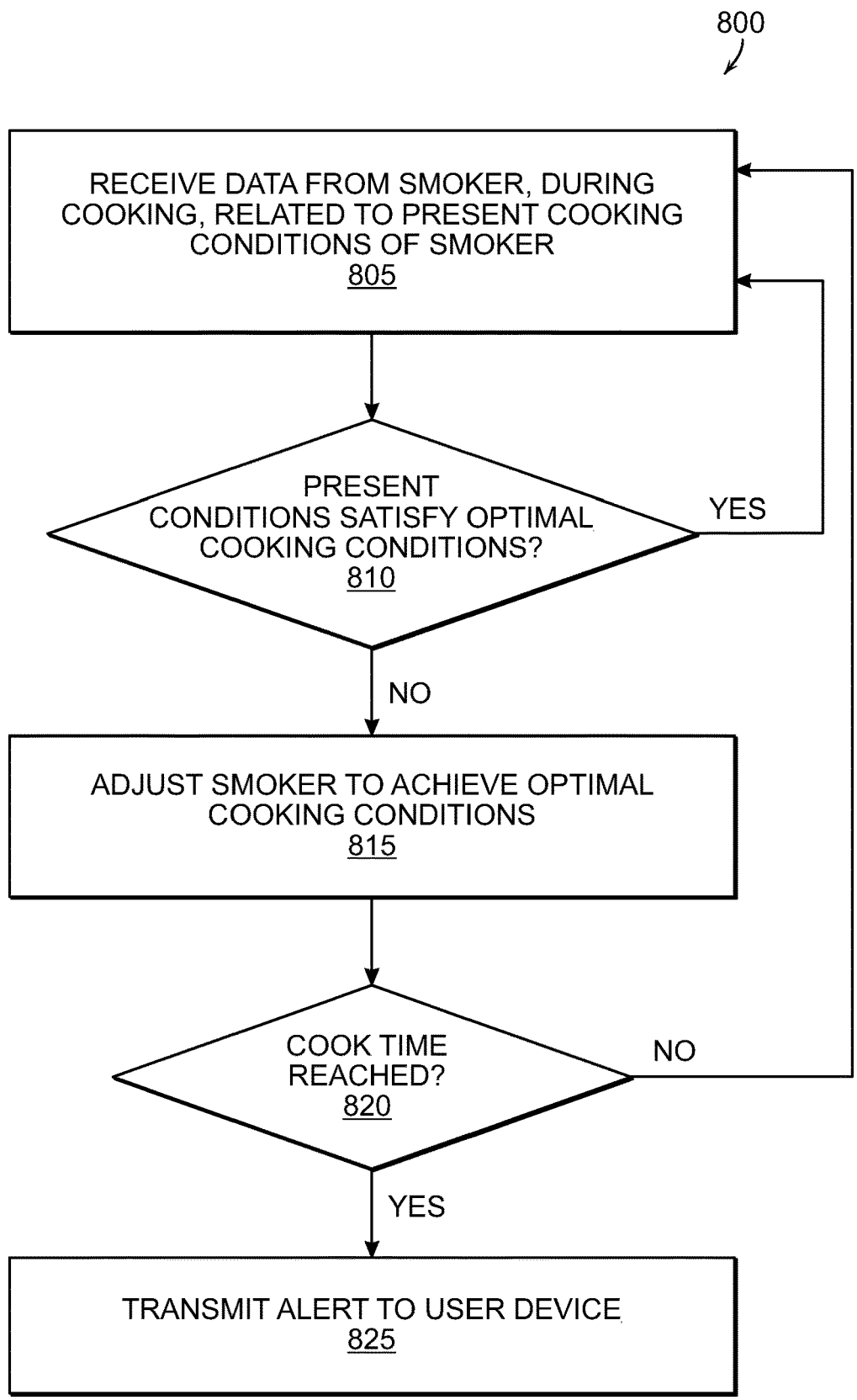
FIG. 8 is a flowchart depicting a method for maintaining optimal cooking conditions of the smoker, according to an embodiment.

FIG. 8 is a flowchart depicting a method 800 for maintaining optimal cooking conditions of the smoker, according to an example embodiment. At block 805, the control device 150, 150' of the smoker receives data from the smoker during cooking. This data is collected by the sensors 125, 125' and relate to present cooking conditions of the smoker. As described above, the sensors 125, 125' may collect data related to interior temperature of the smoker, ambient conditions, air flow, smoke particles, humidity levels, and the like. In some embodiments, the sensor may collect data related to the food (e.g., a surface or internal food temperature). At block 810, the control device 150, 150' determines if the present conditions satisfy the optimal cooking conditions. The optimal cooking conditions may be determined according to method 600 described above. If the present conditions satisfy or meet the optimal cooking conditions, then method 800 returns to block 805 and continues to receive data related to the present cooking conditions of the smoker.

If the present conditions do not satisfy or meet the optimal cooking conditions, then method 800 continues to block 815, where the control device 150, 150' adjusts the smoker to achieve optimal cooking conditions. As described above, the control device 150, 150' may control various features of the smoker, such as the air flow control mechanisms and the air vents, to adjust the interior temperature of the smoker or the air and smoke flow in the smoker or both. At block 820, the control device 150, 150' checks if the cook time has been reached. If cook time has not been reached, then the control device 150, 150' continues to receive data related to the present cooking conditions at block 805. If cook time is reached, then at block 825 an alert is transmitted to the user device indicating that the cook time has been reached.

The method 800 is described as being performed by the control device 150, 150'. In an alternative embodiment, the method 800 may be performed by a server (e.g., server 1030). In another embodiment, some of the steps of method 800 may be performed by the control device 150, 150', while other of the steps of method 800 are performed by a server (e.g., server 1030).

In one embodiment, a cook time may be determined for a type of food. A non-limiting example of an equation to estimate cook time is as follows:

$$\text{Time to Cook } t = \ln\left(\frac{e^{\lambda_{21}L_{21}\lambda_{22}L_{22}(T_d-T_s)}}{A_1 A_2 e^{\alpha 2}(T_i - T_s)}\right) \quad \text{Equation 1}$$

where $\alpha$ is thermal diffusivity, A and $\lambda$ are conduction coefficients based on the food's heat transfer coefficient, thermal conductivity, and size of food, $T_i$ is the current internal food temperature, $T_s$ is the smoker air temperature, and $T_d$ is the desired food temperature. In some cases, equation 1 provides a relatively accurate initial estimate of total cook time; however, it is less accurate at estimating remaining time to cook for relatively short time intervals.

At shorter time intervals after the food has already been cooking long enough to significantly warm up, the food acts as one solid body and it can be assumed that the food is at one uniform temperature. In some embodiments, a simpler version of equation 1 can be used:

$$\text{Time to Cook } t = \frac{-1}{b}\ln\frac{(T_d - T_s)}{(T_i - T_s)} \quad \text{Equation 2}$$

$$\text{where } b = \frac{hA}{mC_p} \quad \text{Equation 3}$$

and where h is heat coefficient, A is the surface area, m is mass, and $C_p$ is heat capacity.

Equation 2 uses principles of conduction and the Biot number b to derive an accurate cook time using the temperature of the smoker, internal temperature of the meat and the desired internal temperature and the result is displayed to the user.

In an example embodiment, during a 12 hour smoke, the control device 150, 150' and/or the user device may use a combination of equation 1 and equation 2, where the two different prediction equations are weighted according to a stage of cooking or time passed during cooking. For example, at initiation of cooking, the prediction could be entirely weighted with equation 1 (the long-term cook time prediction model) and after 12 hours of cooking or near the end of the initially predicted total cook time, the prediction could be entirely weighted with equation 2 (the short-term cook time prediction model) with the prediction being a weighted combination of the two models at times in between. The weighting may be adjusted gradually or incrementally (e.g. each hour or every 2 hours) throughout cooking.

Ratios for the use of long-term and short-term are approximate and depend on the Fourier coefficient Fo which changes with time and has the formula:

$$Fo = \alpha * t / L^2 \quad \text{Equation 4}$$

where $\alpha$ is thermal diffusivity of food, t is time and L is the average length of the sides of the food. When the Fourier coefficient Fo drops below 0.2, the long-term cook time prediction model (equation 1) gives way to the short-term model (equation 2).

Figure 9:
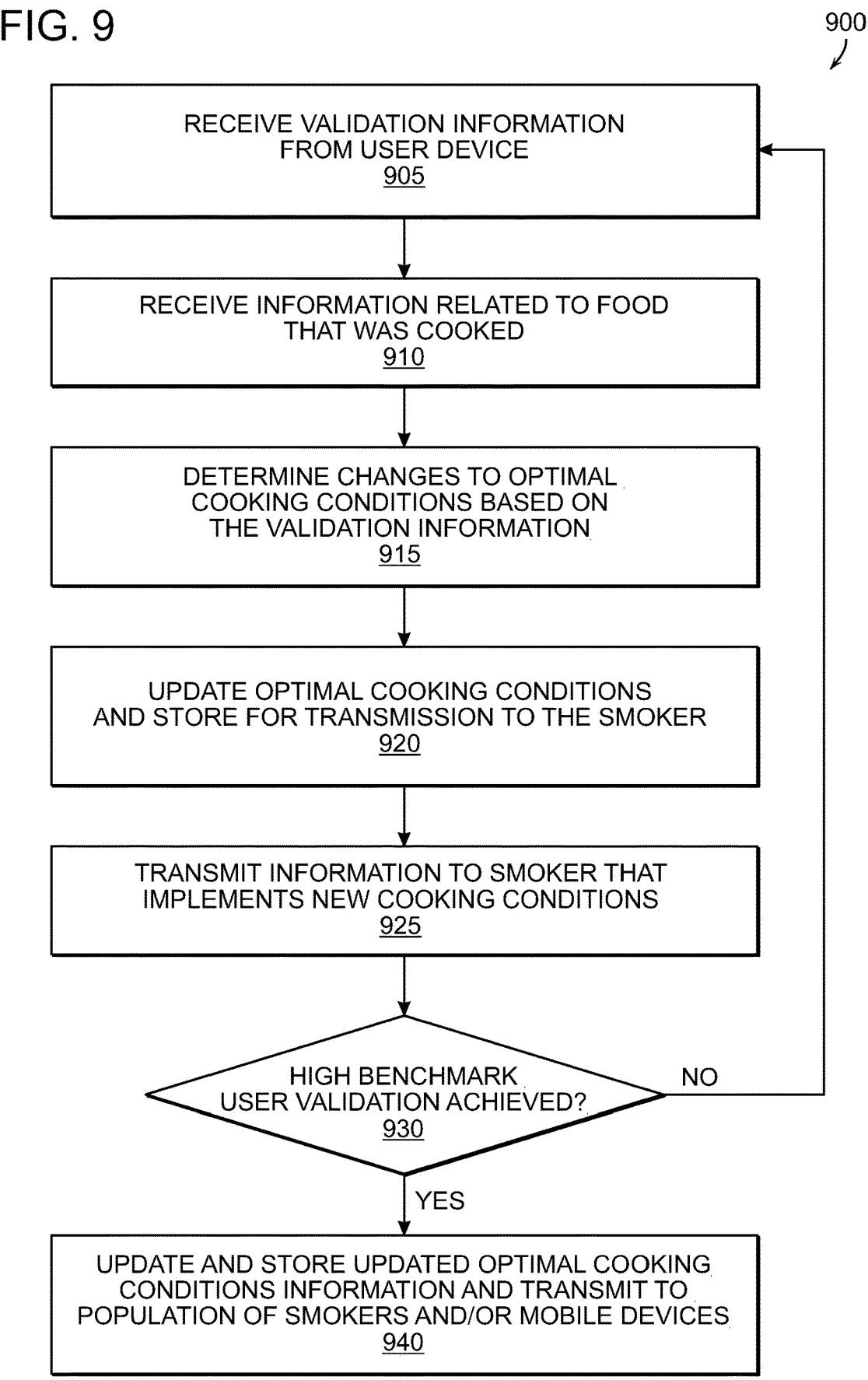
FIG. 9 is a flowchart depicting a method for updating optimal cooking conditions based on user feedback, according to an embodiment.

FIG. 9 is a flowchart depicting a method 900 for updating optimal cooking conditions based on user feedback, according to an example embodiment. At block 905, a server receives validation information from a user device. The validation information may indicate feedback on the food cooked in the smoker. The validation information may be in the form of a survey or rating of various factors of the cooked food. At block 910, the server receives information related to the food that was cooked. This information may indicate type of food, size, shape, weight, and/or cut of food (when food is meat). In some embodiments, the validation information and the food information is received from multiple user devices (associated with owners/users of multiple smokers) for a variety of cooked food. In this manner, the server may receive and collect information related to various food and multiple smokers.

At block 915, the server determines changes to the optimal cooking conditions based on the validation information. The optimal cooking conditions can be determined according to method 600 described above. Based on feedback received from a user, the optimal cooking conditions for various food can be revised or changed. At block 920, the optimal cooking conditions are updated and stored for transmission to a smoker associated with the user device. At block 925, the information regarding the optimal cooking conditions is transmitted to a smoker associated with the user device so that the smoker can implement the new cooking conditions.

In some embodiments, the server receives validation information from multiple different user devices corresponding to multiple different smokers or from multiple different smokers themselves. The received user validation information for each is associated with a quantitative score. A high benchmark threshold is sent for scores based on received user validation information associated with multiple different smokers (e.g., a number of users or a percentage of users reporting a score above threshold; a threshold for an aggregated score or weighted score from multiple users; etc.). If the high benchmark for user validation is achieved at block 930, the server updates and stores the updated optimal cooking conditions information and transmits the updated optimal cooking conditions information to a population of smokers (e.g., smokers of the same model or having the same body type) (block 940). In some embodiments, the updated optimal cooking conditions information may also be transmitted to mobile devices associated with the population of smokers. If the high benchmark for user validation is not reached at block 930, the server does not transmit updated optimal cooking conditions information to the population of smokers or mobile devices.

In one embodiment, the optimal cooking conditions may be represented as a temperature curve for the interior temperature of the smoker over the cooking period for a type of food.

In some embodiments, validation information is received from a user via a mobile device and information related to food that was cooked is received from a user via a mobile device. In some embodiments, changes to optimal cooking conditions may be determined based on the validation information using code executing on the mobile device. The mobile device may update the optimal cooking conditions, store the information for transmission to the smoker, and transmit the information to the smoker.

In some embodiments, validation information and information related to food that was cooked is received from a user via a user interface associated with the smoker itself (e.g., a user interface on the smoker or a display associated with the smoker). In some embodiments, changes to optimal cooking conditions may be determined based on the validation information using code executing on a microprocessor associated with the smoker itself. In some embodiments, changes to the optimal cooking conditions may be stored by the control device of the smoker itself.

As described herein, an example system for an automated smoker can include an application on a user device (e.g., mobile device), an embedded system (e.g., control device 150, 150') on the smoker, a server or computer device for analyzing data, and a communication network that integrates the components of the example system.

The application on the user device provides a user the ability to remotely adjust cook time by, for example, increasing or decreasing the flow of air or smoke in the smoker. This can be done by remotely controlling the air flow control mechanism 145, 145'. The application also provides the ability to track the smoking process, for example, time remaining, fuel remaining, food temperature, etc. Additionally, the application can also display alerts on the user device when the smoker is malfunctioning, when the end of cook time is close, when the end of cook time is reached, and when the smoker needs to be refueled. In some embodiments, the application may use the user device's GPS to determine that the user is not in proximity of the smoker, and generate an alert on the user device that end of cook time is approaching and he or she should get back to the smoker. The application can also be used to input food information, such as type of food, size, weight, shape, etc., and receive optimal cooking conditions. After food is cooked, the application can also prompt the user to enter validation information or feedback on the quality of the cooked food. This information may be used to adjust optimal cooking conditions according to method 900 described above.

In some embodiments, the embedded system on the smoker may be configured to receive temperature data from the sensors in the smoker, determine when the lid of the smoker is open, determine refueling needs, and determine emergency alerts. The embedded system may be configured to control the air flow control mechanism, determine malfunction of the smoker, and accelerate the cooking time. In some embodiments, the embedded system may be configured to turn the smoker off in case hazardous conditions are detected.

The embedded system on the smoker can perform incremental temperature adjustments through the control of the air flow control mechanism in order to follow predetermined optimal cooking conditions (e.g., a temperature curve) that may be altered by the user via the user device in order to accelerate or decelerate the smoking process. The optimal cooking conditions may be updated based on aggregated data from all deployed smokers. The embedded system can perform remaining fuel estimations and communicate this information to a server or a user device. The embedded system may also generate alerts based on a user's location, for example, an alert to the user to return to the smoker when the end of cook time is near.

Various data and factors can be used to control the cooking process. In an example embodiment, the location of the smoker, food properties, and change of cook schedule can be provided by the user device to a server. In some embodiments, the location of the smoker, or the location of a mobile device in communication with the smoker, can be used to determine local weather conditions that may affect the optimal cooking conditions for the food. In some embodiments, the embedded system on the smoker can provide temperature data, time stamp, and status of the air flow control mechanism to the server. The server can provide recipe or optimal cooking conditions, alerts, and cook time to the user device. The server can also control the air flow control mechanism based on the various data and factors received from the mobile device and the smoker. The data and factors can be provided to and from the server via a communication network (e.g., network 1005).

In addition to the data and factors for the cooking process, various data and information can also be collected via the example system for feedback on the cooking process and for augmenting the cooking process. This data and information can be collected from multiple users to build a community or social network of smoker users and sustain their interactions with the smoker and other users. The user device can provide profile information (favorite food, preferred cook type, e.g., tough or tender, rare or well-done, etc.), forum information, invitation list, food list or menu for event, shopping or supplies list, and future dates for events. A user can also send messages to other users. In this manner, a user can use the application on his or her user device to organize and plan an event and send invitations for the event to other users. The user device can receive images of the event and food shared by other users, and rating or feedback on the event from other users. In some embodiments, the user device may also receive thermal images of the smoker during the cooking process.

Other users who may be guests at an event, can provide via their user devices a feedback for the event, an RSVP message, and an updated menu for the event (if he or she is providing a food item at the event). The guest's user device may also receive a guest list for the event, an updated menu for the event, and invitation to the event.

Figure 10:
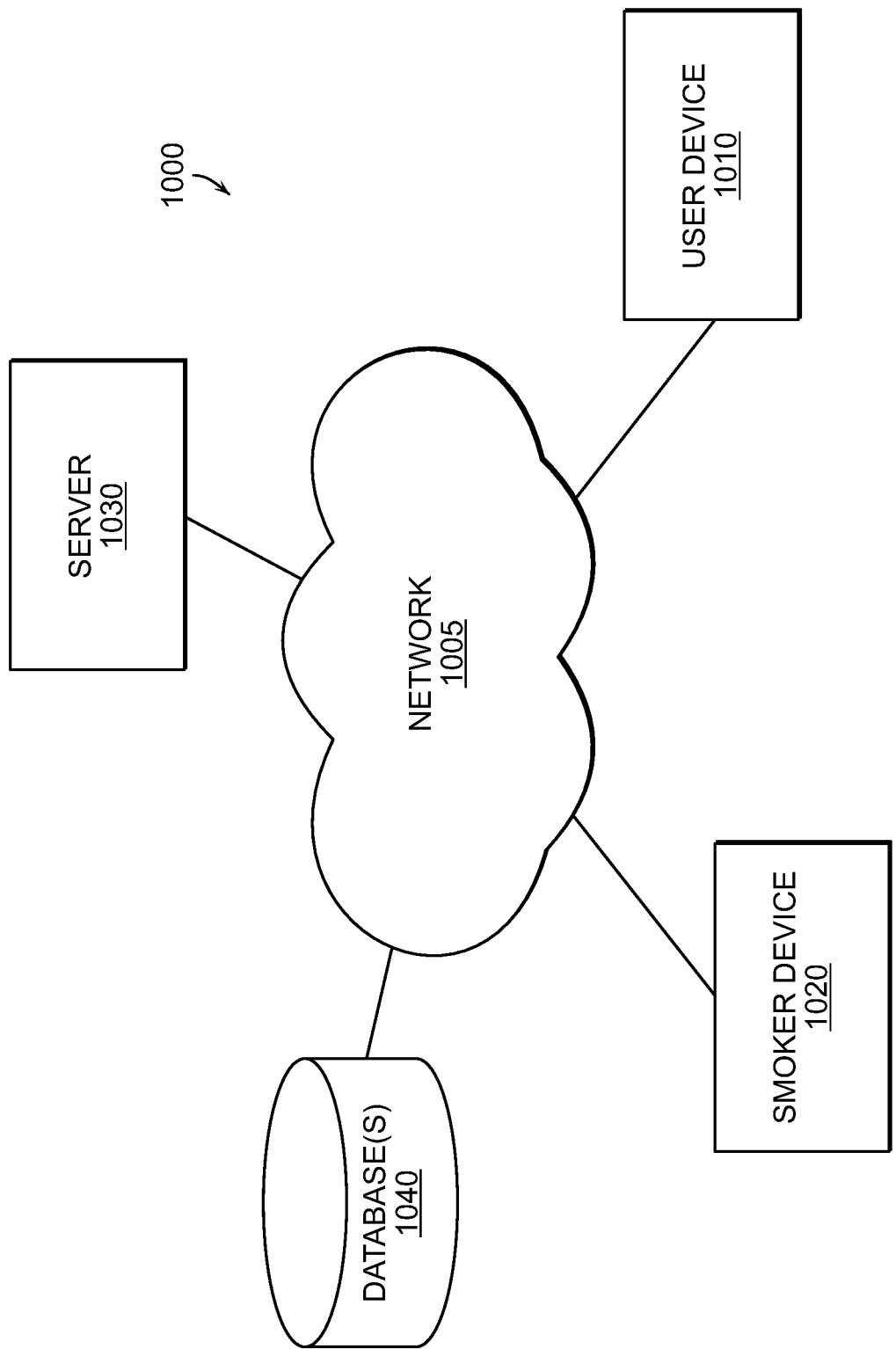
FIG. 10 illustrates a network diagram depicting a system for implementing an automated barbecue smoker, according to an embodiment.

FIG. 10 illustrates a network diagram depicting a system 1000 for implementing systems and methods related to the automated barbecue smoker described herein. The system 1000 can include a network 1005, user device 1010, smoker device 1020, server 1030, and a database(s) 1040. Each of the devices 1010, 1020, servers 1030, and database(s) 1040 is in communication with the network 1005.

In an example embodiment, one or more portions of network 1005 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The user device 1010 may comprise, but is not limited to, work stations, computers, general purpose computers, Internet appliances, hand-held devices, wireless devices, portable devices, wearable computers, cellular or mobile phones (for e.g., mobile device 510), portable digital assistants (PDAs), smart phones, tablets, ultrabooks, netbooks, laptops, desktops, multi-processor systems, microprocessor-based or programmable consumer electronics, network PCs, mini-computers, and the like.

The smoker device 1020 may be the control device 150 discussed in connection with FIGS. 1A and 1B, and may comprise, but is not limited to, an embedded computer system, hand-held devices, wireless devices, portable devices, wearable computers, cellular or mobile phones, portable digital assistants (PDAs), smart phones, tablets, ultrabooks, netbooks, multi-processor systems, microprocessor-based or programmable consumer electronics, network PCs, mini-computers, and the like.

Each of devices 1010, 1020 may connect to network 1005 via a wired or wireless connection. In an example embodiment, the devices 1010, 1020 may perform all the functionalities described herein.

In other embodiments, the server 1030 performs the functionalities described herein. In yet another embodiment, the devices 1010, 1020 may perform some of the functionalities, and server 1030 performs the other functionalities described herein.

Each of the database(s) 1040 and server 1030 is connected to the network 1005 via a wired connection. Alternatively, one or more of the database(s) 1040, and server 1030 may be connected to the network 1005 via a wireless connection. Although not shown, server 1030 can be (directly) connected to the database(s) 1040. Server 1030 comprises one or more computers or processors configured to communicate with devices 1010, 1020 via network 1005. Server 1030 hosts one or more applications or websites accessed by devices 1010, 1020 and/or facilitates access to the content of database(s) 1040. Database(s) 1040 comprise one or more storage devices for storing data and/or instructions (or code) for use by server 1030 and/or devices 1010, 1020. Database(s) 1040, and/or server 1030 may be located at one or more geographically distributed locations from each other or from devices 1010, 1020. Alternatively, database(s) 1040 may be included within server 1030.

Figure 11:
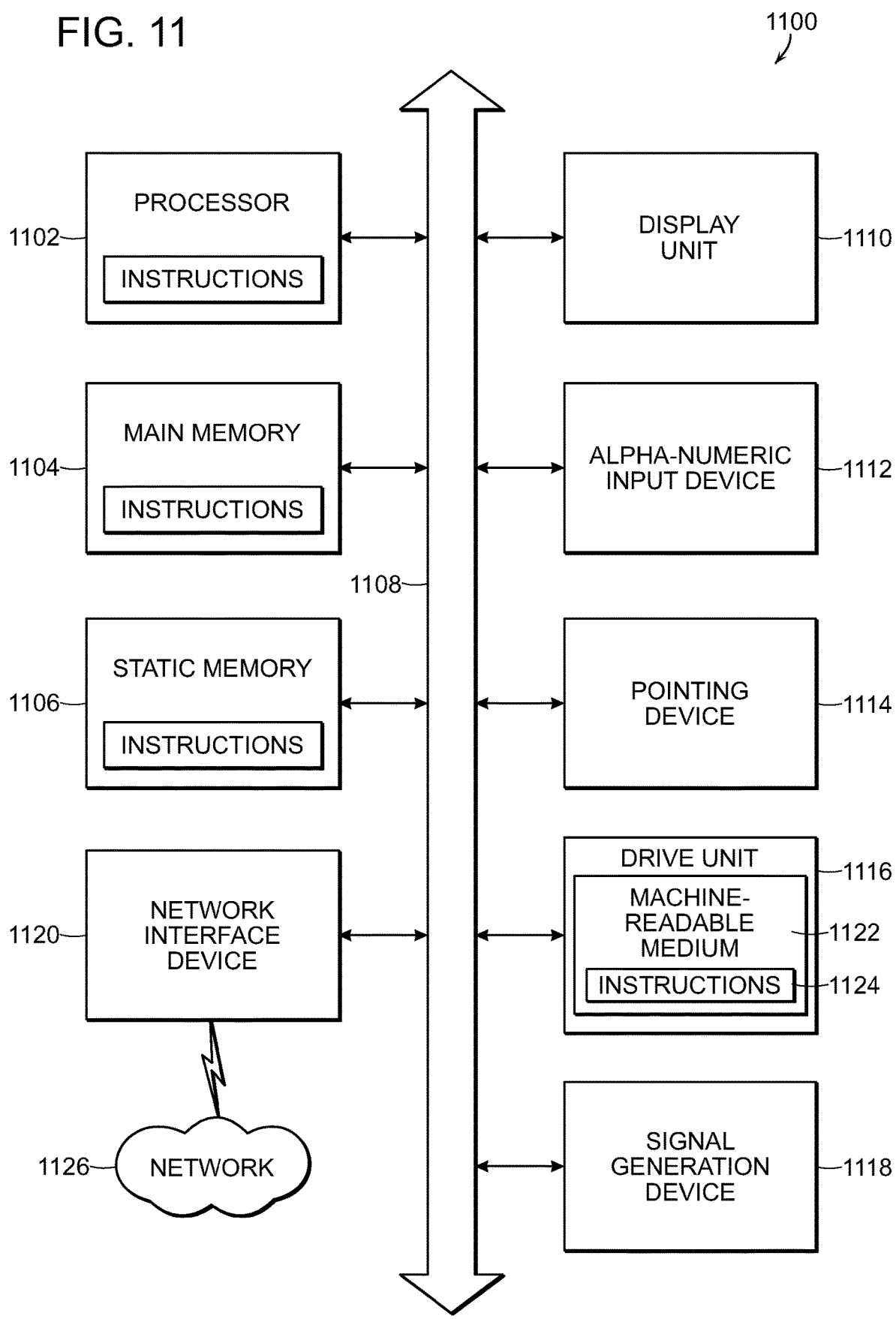
FIG. 11 is a block diagram of an exemplary computing system that may be used to implement embodiments of the automated smoker described herein.

FIG. 11 is a block diagram of machine in the example form of a computer system 1100 (e.g., the mobile device or embedded computer system) within which instructions for causing the machine to perform any one or more of the methodologies discussed herein may be executed. The machine may operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet, a PDA, a cellular telephone, a smartphone, a web appliance, or any other machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a multi-core processor, and/or a graphics processing unit (GPU)), a main memory 1104 and a static memory 1106, which communicate with each other via a bus 1108. The computer system 1100 may further include a display unit 1110 (e.g., a liquid crystal display (LCD), a light-emitting diode (LED) display, a LED-backlit LCD display, a touch-screen display, or a cathode ray tube (CRT)). The computer system 1100 also includes an alphanumeric input device 1112 (e.g., a physical or virtual keyboard), a pointing device 1114 (e.g., a mouse, a touchpad, or a trackpad), a disk drive unit 1116, a signal generation device 1118 (e.g., a speaker) and a network interface device 1120.

The disk drive unit 1116 includes a machine-readable medium 1122 on which is stored one or more sets of instructions and data structures (e.g., software) 1124 embodying or used by any one or more of the methodologies or functions described herein. The instructions 1124 may also reside, completely or at least partially, within the main memory 1104, static memory 1106, and/or within the processor 1102 during execution thereof by the computer system 1100, the main memory 1104 and the processor 1102 also constituting machine-readable media.

While the machine-readable medium 1122 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; solid-state disks; dual-drive hybrid disks; solid-state hybrid disks; and CD-ROM and DVD-ROM disks).

The instructions 1124 may further be transmitted or received over a communications network 1126 using a transmission medium. The instructions 1124 may be transmitted using the network interface device 1120 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi, WiMax or Bluetooth networks). The term "transmission medium" shall be taken to include any intangible medium that is capable of storing, encoding or carrying instructions for execution by the machine, and includes digital or analog communications signals or other intangible media to facilitate communication of such software.

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

It will be appreciated that, for clarity purposes, the above description describes some embodiments with reference to different functional units or processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," and "third" and so forth are used merely as labels, and are not intended to impose numerical requirements on their objects.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A barbecue smoker device for cooking food, the barbecue smoker device comprising:
    a food platform;
    a container body having an upper portion and a lower portion, the lower portion of the container body including a narrowed portion having an interior surface with a hyperboloid shape defining a waist of the container body disposed below the food platform;
    an upper vent disposed at the upper portion of the container body; and
    at least one lower vent disposed at the lower portion of the container body, wherein the barbeque smoker device is configured such that all heat sources for cooking food are positioned below the waist of the container body.

2. The barbecue smoker device of claim 1, wherein the lower portion of the container body comprises an exterior wall spaced apart from an interior wall by an insulating layer.

3. The barbeque smoker device of claim 1, wherein a shape of the container body in the narrowed portion flares outward above the waist and flares outward below the waist.

4. The barbeque smoker device of claim 1, wherein a ratio of a radius of an interior surface of the container body at the food platform to a radius of the interior surface of the container body at the waist falls in a range of 1.2 to 1.8.

5. The barbeque smoker device of claim 4, wherein the ratio of the radius of the interior surface of the container body at the food platform to the radius of the interior surface of the container body at the waist falls in a range of 1.2 to 1.6.

6. The barbecue smoker device of claim 1, further comprising:
   an air flow control mechanism comprising a fan disposed at the lower portion of the container body;
   at least one sensor; and
   a control device comprising at least one microcontroller, microprocessor, or PID controller and configured to collect data from the at least one sensor and to adjust airflow using the air flow control mechanism based on the data collected.

7. The barbecue smoker device of claim 6, further comprising a fan associated with the at least one lower vent configured to draw air into the container body, wherein a plane of rotation of blades of the fan is perpendicular to a wall of the container body where the at least one lower vent is disposed.

8. The barbecue smoker device of claim 6, further comprising a fan associated with the at least one lower vent configured to draw air into the container body, the fan oriented to direct airflow vertically downward.

9. The barbecue smoker device of claim 6, wherein the lower portion of the container body comprises an exterior wall spaced apart from an interior wall by an insulating layer.

10. The barbecue smoker device of claim 9, wherein the insulating layer comprises an air gap.

11. The barbecue smoker device of claim 9, wherein the insulating layer comprises a ceramic.

12. The barbecue smoker device of claim 6, wherein the control device is programmed to determine desired smoking conditions based on user input regarding food to be cooked.

13. A system for remotely controlling a barbecue smoker device, the system comprising: a barbecue smoker device according to claim 6 coupled to a processor and a display unit; and a mobile device in wireless communication with the barbecue smoker device, the mobile device configured to display a graphical user interface; wherein the graphical user interface is configured to receive input from a user, the input causing a configuration change in the barbecue smoker device.

14. The system of claim 13, wherein the barbecue smoker device is configured to communicate data from the one or more sensors to the mobile device.

15. The system of claim 13, wherein the input relates to a change in cook time.

16. The system of claim 13, wherein the input causes a change in the operational status of the air flow control mechanism.

* * * * *